United States Patent [19]
Sivers et al.

[11] Patent Number: 5,748,768
[45] Date of Patent: May 5, 1998

[54] METHOD AND APPARATUS FOR CORRECTING DISTORTION IN AN IMAGING SYSTEM

[75] Inventors: Erlvada A. Sivers, Lake Oswego, Oreg.; Michael D. Silver, Northbrook; Bruce M. Drawert, Vernon Hills, both of Ill.

[73] Assignee: Kabushiki Kaisha Toshiba, Kanagawa-ken, Japan

[21] Appl. No.: 322,024

[22] Filed: Oct. 7, 1994

Related U.S. Application Data

[63] Continuation of Ser. No. 968,684, Oct. 30, 1992, abandoned.

[51] Int. Cl.⁶ .................................................. G06K 9/00
[52] U.S. Cl. .......................... 382/130; 128/653.2; 378/21; 382/131
[58] Field of Search ............................... 382/128, 130, 382/131, 132, 205, 298, 299, 300; 364/413.23, 413.14, 413.18, 413.19

[56] References Cited

U.S. PATENT DOCUMENTS

| | | |
|---|---|---|
| 3,207,998 | 9/1965 | Corney et al. |
| 3,584,146 | 6/1971 | Cath ................................ 348/243 |
| 3,905,045 | 9/1975 | Nickel .............................. 382/130 |
| 4,215,371 | 7/1980 | Baggett et al. ................... 348/695 |
| 4,589,025 | 5/1986 | Monahan et al. ................. 348/243 |
| 4,602,291 | 7/1986 | Temes .............................. 348/243 |
| 4,677,388 | 6/1987 | Morrison . |
| 5,029,586 | 7/1991 | Honda ............................. 364/413.23 |
| 5,034,988 | 7/1991 | Fujiwara .......................... 382/130 |
| 5,051,902 | 9/1991 | Hishinuma ....................... 364/413.23 |
| 5,231,673 | 7/1993 | Elenga ............................. 382/132 |
| 5,243,664 | 9/1993 | Tuy .................................. 382/130 |
| 5,297,036 | 3/1994 | Grimaud .......................... 382/132 |
| 5,327,501 | 7/1994 | Kato et al. ....................... 382/293 |
| 5,359,513 | 10/1994 | Kano et al. ...................... 364/413.23 |
| 5,400,377 | 3/1995 | Hu et al. .......................... 364/413.14 |
| 5,402,338 | 3/1995 | Ito .................................... 364/413.23 |
| 5,452,373 | 9/1995 | Shou et al. ....................... 382/205 |

FOREIGN PATENT DOCUMENTS

| | | | |
|---|---|---|---|
| 2228643 | 8/1990 | United Kingdom | H04N 5/18 |

OTHER PUBLICATIONS

D.P. Chakraborty, Image Intensifier Distortion Correction, 14(2) Med. Phys. 249–252, Mar./Apr. 1987.

Boone et al., Analysis and Correction of Imperfections in the Image Intensifier TV-Digitizer Imaging Chain, Presented at the 75th annual meeting of the Radiological Society of North America, Nov. 27, 1989, 29 pages.

*Primary Examiner*—Joseph Mancuso
*Assistant Examiner*—Jayanti K. Patel
*Attorney, Agent, or Firm*—Finnegan, Henderson, Farabow, Garrett & Dunner, L.L.P.

[57] ABSTRACT

A method and apparatus to calibrate and correct magnetic and geometrical distortions in an imaging system, specifically a computed tomography (CT) system, includes a distortion measuring object which is placed on the surface of an image intensifier. An image frame of the distortion measuring object is generated, and a correction table is generated to correct the image frame. Once the correction table has been generated using the distortion measuring object, subsequent image frames are corrected using the correction values in the correction tables. A method and apparatus to calibrate and correct offsets, veiling glare and scatter in an imaging system, specifically a computed tomography system. An image frame is generated and areas not directly impinged by direct radiation are used to correct areas of the detector that are directly impinged. A method and apparatus for correcting and calibrating an imaging system, specifically a computed tomography system. An image frame is corrected for distortions and for the effects of offsets, veiling glare and scatter.

31 Claims, 14 Drawing Sheets

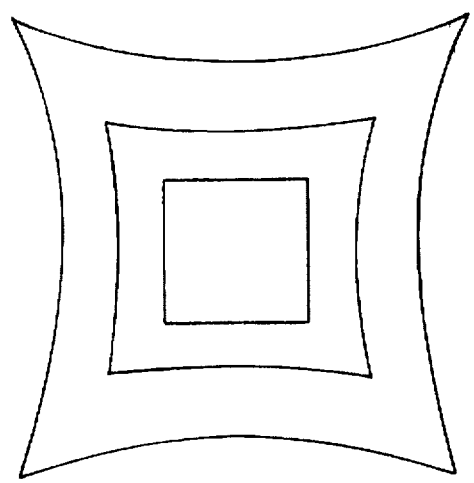
FIG. 1
FIG. 4
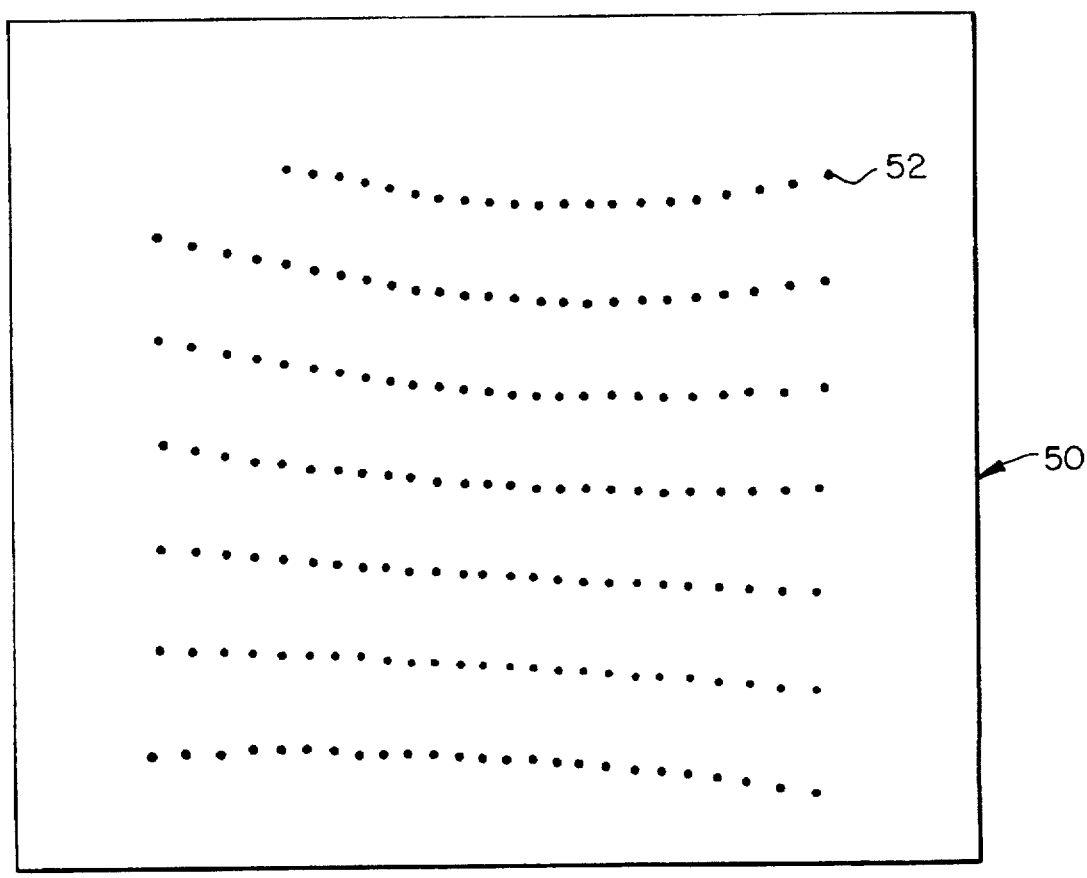

CORRECTION TABLE

IMAGE FRAME 37

METHOD AND APPARATUS FOR CORRECTING DISTORTION IN AN IMAGING SYSTEM

This application is a continuation of application Ser. No. 07/968,684 filed Oct. 30, 1992, now abandoned.

BACKGROUND OF THE INVENTION

1. Field of The Invention

The present invention relates to a method and apparatus for calibrating and correcting an imaging system, and, more specifically, to calibrating and correcting an image intensifier-based computed tomography (CT) system.

2. Description of The Related Art

An image intensifier-based CT system utilizes an image intensifier to detect x rays emitted by an x-ray source after they are passed through an object under test. The image intensifier converts x-ray photons first to optical photons and then to electrons. The electrons are accelerated and focused down the length of the image intensifier onto a small phosphor screen. The phosphor screen generates an image which is recorded by an optical sensor which outputs a video signal typically formatted into 525 lines of video information. This video signal is then digitized for further processing.

Depending on the application, a two-dimensional slice image of an object under test or the full volume of the object is reconstructed from a plurality of image frames corresponding to a plurality of views of the object under test taken as the object under test is rotated 360° on a turntable (turntable rotation) or as the x-ray source and image intensifier are rotated 360° around the stationary object under test (gantry rotation). For example, if the system produces 30 image frames per second and the turntable or gantry completes one rotation every 60 seconds, the slice image will be reconstructed from 1800 separate image frames corresponding to 1800 distinct views of the object under test.

The reconstruction of a two-dimensional slice uses only a small portion of each image frame in a fan beam geometry while the reconstruction of the full volume uses most if not all of each image frame in a cone beam geometry. In the fan beam geometry, each image frame is reduced to a single line during processing, while in the cone beam geometry, the two-dimensional nature of the image frame is maintained.

Image intensifiers known in the art impart two distortions to the positions of detected x-ray photons. The first distortion is due to the construction geometry of the image intensifier and is referred to as "geometrical" distortion. This distortion causes a pagoda-like distortion of the detected image frame. That is, if a set of nested squares are formed by wires and placed on the entrance surface of the image intensifier, the output image appears as shown in FIG. 1. This is also referred to as "pin-cushion" distortion.

The second distortion is caused by the magnetic force of the earth, and will be found in any imaging system using an x-ray detector having an electron tube. Because the image intensifier accelerates electrons down its length, these electrons are subject to magnetic distorting forces of the form:

$$\vec{F} = q\,\vec{v} \times \vec{B}, \quad (1)$$

where $\vec{F}$ is the distorting force vector;

q is the elementary charge of the electron;

$\vec{v}$ is the velocity vector of the electron; and $\vec{B}$ is the magnetic field vector of the earth.

This distorting force further twists the image of FIG. 1.

If the imaging system is a turntable rotation system, these two distortions are constant for each image frame generated by the image intensifier. However, if the imaging system is a gantry rotation system, the magnetic distortion differs for each image frame generated by the image intensifier. The magnetic distorting force distorts each image frame differently due to the different orientation of the image intensifier as the gantry rotates.

Additional magnetic distortions result in any imaging system using a tube TV camera as an optical sensor as a result of the moving electrons in the TV imaging tube.

Contributions to the image signal from offsets, veiling glare and scatter also degrade the image of an image intensifier-based CT system. Offsets are the non-zero signal levels of the data acquisition system (the detector, image intensifier, video camera, etc.) when the system is functioning, but the x-ray source is not turned on. Veiling glare consists of x rays, electrons and optical photons scattered inside the image intensifier. The veiling glare causes a spatially low frequency "fog" that is proportional to the input flux of the image intensifier.

Scatter (Compton scattering) refers to x rays deflected from their original direction by the scanned object at a lower energy and in a different direction and therefore impinge the detector at a different location than if not deflected. Thus, x rays that would not have impinged the face of the detector at that location if they had been absorbed by the object now strike the face of the detector at an inappropriate location and energy. These scattered x rays contribute to the signal and distort the "true" signal at that location.

SUMMARY OF THE PRESENT INVENTION

Accordingly, it is an object of the present invention to provide a method and apparatus for calibrating and correcting an imaging system.

It is another object of the present invention to provide a method and apparatus to calibrate and correct magnetic and geometrical distortions in an imaging system.

It is another object of the present invention to provide a method and apparatus to calibrate and correct spatial distortion in an imaging system.

It is another object of the present invention to provide a method and apparatus to calibrate and correct the effects of extraneous signals in an imaging system.

It is another object of the present invention to provide a method and apparatus to calibrate and correct the effects of offsets in an imaging system.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, a system is provided for correcting distortions in an imaging system including a distortion measuring object having a plurality of reference point attenuators at predetermined spaced locations in said distortion measuring object, a background measuring object, said correcting system comprising: means for generating a first image frame of said distortion measuring object with said plurality of reference point attenuators at said locations, said first image frame having representations of said reference point attenuators, said first image frame including spatial distortion; means for generating a second image frame of said background measuring object; means for subtracting the two generated image frames to produce a subtracted image frame including spatial distortion; and means for removing said spatial distortion, including: means for automatically detecting approximate two-dimensional coordinates of said reference point attenuator representations in said subtracted image frame; means for fitting a plurality of smooth curves in two approximately orthogonal directions having curvatures corresponding to the reference point attenuator representations; means for determining refined two-dimensional coordinates in said subtracted image frame by locating intersections of said plurality of smooth curves; means for generating a correction table including a two-dimensional correction coordinate corresponding to each refined two-dimensional coordinate in said subtracted image frame; and means for correcting said distortion of an image of the object under test in accordance with said correction coordinates in the correction table, and for providing a corrected image of the object under test.

To further achieve the foregoing objects, a system is provided for reducing the effect of extraneous signals, including offsets, veiling glare, and/or scatter, in an imaging system, the imaging system including means for generating a beam of x rays having a predetermined beam shape and means for detecting x rays of the x-ray beam, the beam having a cross section projected on the detecting means to define a directly irradiated area of the detecting means and at least one non-irradiated area of the detecting means adjacent to the directly irradiated area, and means for generating an image frame representative of the detected x rays of the x-ray beam, the image frame having columns and rows of data values corresponding to at least one of detected x rays and extraneous signals, said extraneous signals reduction system comprising: means for defining a first area of the image frame corresponding to the directly irradiated area of the detecting means; means for defining at least one second area of the image frame corresponding to the at least one non-irradiated area of the detecting means; and means for correcting the data values in the first area of the image frame in accordance with the data values from the at least one second area of the image frame.

To further achieve the foregoing objects, a system is provided for reducing the effects of extraneous signals in an imaging system wherein the imaging system is for imaging an object under test, the imaging system further including a distortion measuring object having a plurality of reference point attenuators at predetermined spaced locations in said distortion measuring object and a background measuring object, said extraneous signals reduction system further including: means for generating a first image frame of said background measuring object with said plurality of reference point attenuators in said locations, said first image frame having representations of said reference point attenuators, said first image frame including spatial distortions; means for generating a second image frame of said background measuring object; means for subtracting the two generated image frames to produce a subtracted image frame including spatial distortion; means for removing said spatial distortion, including: means for automatically detecting approximate two-dimensional coordinates of said reference point attenuator representations in said subtracted image frame; means for fitting a plurality of smooth curves in two approximately orthogonal directions having curvatures corresponding to the reference point attenuator representations; means for determining refined two-dimensional coordinates in said image frame by locating intersections of said plurality of smooth curves; means for generating a correction table including a two-dimensional correction coordinate corresponding to each refined two-dimensional coordinate in the image frame; and means for correcting said distortion of an image of the object under test in accordance with said correction coordinates in the correction table, and for providing a corrected image frame of the object under test; and said means for correcting the data values including means for correcting the data values of the corrected image frame.

To further achieve the foregoing objects, a system is provided for reducing the effects of extraneous signals, wherein means for removing the effects of extraneous signals from the image frame is preceded by a means for removing distortion of the image wherein said means for removing distortion comprises: means for generating a first image frame of a distortion measuring object having a plurality of reference point attenuators at predetermined space locations, said first image frame having representations of said reference point attenuators, said first image frame including spatial distortions; means for generating a second image frame of a background measuring object; means for subtracting the two generated image frames to produce a subtracted image frame including spatial distortion; and means for removing said spatial distortion, including: means for automatically detecting approximate two-dimensional coordinates of said reference point attenuator representations in said subtracted image frame; means for fitting a plurality of smooth curves in two approximately orthogonal directions having curvatures corresponding to the reference point attenuator representations; means for determining refined two-dimensional coordinates in said image frame by locating intersections of said plurality of smooth curves; means for generating a correction table including a two-dimensional correction coordinate corresponding to each refined two-dimensional coordinate in the image frame; and means for correcting said distortion of an image of the object under test in accordance with said correction coordinates in the correction table, and for providing a corrected image frame of the object under test.

To further achieve the foregoing objects, a correction system is provided for correcting the effects of offsets in an imaging system, the imaging system including a source of radiation, a detection system which includes a radiation detector means disposed for detecting the radiation and for emitting light from a phosphor screen corresponding to the detected radiation, an optical sensor disposed to receive the emitted light from said detector means, the optical sensor outputting a video signal which has a front porch region, a video region, and a back porch region, a digital data acquisition system which includes means for sampling the video signal and for providing a digitized video signal, the imaging system further including means for generating an image frame from the digitized video signal, the image frame having columns and rows of data values corresponding to the emitted light, said correcting system comprising: means for determining an offset magnitude of the detector means when the radiation source is non-operational; and means for removing the offset magnitude from the video region of the video signal.

To further achieve the foregoing objects, and in accordance with the purposes of the invention as embodied and broadly described herein, a method is provided for correcting distortions in an imaging system for imaging an object under test, the imaging system including a distortion measuring object having a plurality of reference point attenuators at predetermined spaced locations in said distortion measuring object, a background measuring object, means for generating x rays and for detecting the generated x rays, means for generating a first image frame of said distortion measuring object with said plurality of reference point attenuators at said locations having representations of said reference point attenuators and including spatial distortion, means for generating a second image frame of said background measuring object, and means for storing the image frames, said correcting method including the steps of: retrieving the image frames; subtracting said image frames to produce a subtracted image frame including spatial distortion; automatically determining approximate two-dimensional coordinates of said reference point attenuator representations in said image frame; fitting a plurality of smooth curves to said two-dimensional coordinates of the reference point attenuator representations, each said smooth curve being parameterized by coefficients; determining refined two-dimensional coordinates in said subtracted image frame by locating intersections of said smooth curves; fitting a plurality of smooth curves to respective coefficients of the curves fit to said two-dimensional coordinates of said points; determining dense points between the two-dimensional coordinates of the reference point attenuator representations; generating a correction table including a two-dimensional correction coordinate corresponding to each refined two-dimensional coordinate in the image frame; and correcting the distortion in an image frame of an object under test in accordance with said correction coordinates in the correction table, and providing for a corrected image of the object under test.

To further achieve the foregoing objects, a method is provided for correcting spatial distortions in an imaging system for imaging an object under test, the imaging system including a distortion measuring object having a plurality of reference point attenuators at predetermined spaced locations in said distortion measuring object and a background measuring object, said correcting method including the steps of: generating a first image frame of said distortion measuring object with said plurality of reference point attenuators at said locations, said first image frame having representations of said reference point attenuators, said first image frame including spatial distortion; generating a second image frame of said background measuring object; subtracting the two generated image frames to produce a subtracted image frame including spatial distortion; and removing said spatial distortion, including: automatically detecting approximate two-dimensional coordinates of said reference point attenuator representations in said subtracted image frame; fitting a plurality of smooth curves in two approximately orthogonal directions having curvatures corresponding to the reference point attenuator representations; determining refined two-dimensional coordinates in said subtracted image frame by locating intersections of said plurality of smooth curves; generating a correction table including a two-dimensional correction coordinate corresponding to each refined two-dimensional coordinate in said subtracted image frame; and correcting said distortion of an image of the object under test in accordance with said correction coordinates in the correction table, and providing a corrected image of the object under test.

To further achieve the foregoing objects, a method is provided for reducing the effects of extraneous signals, including offsets, veiling glare, and/or scatter in an imaging system, the imaging system including means for generating a beam of x rays, the beam having a cross section projected on the detecting means to define a directly irradiated area of the detecting means and at least one non-irradiated area of the detecting means adjacent to the directly irradiated area, and means for generating an image frame representative of the detected x rays of the x-ray beam, the image frame having columns and rows of data values corresponding to at least one of detected x rays and extraneous signals, said reducing method including the steps of: defining a first area of the image frame corresponding to the directly irradiated area of the detecting means; defining at least one second area of the image frame corresponding to the at least one non-irradiated area of the detecting means; and correcting the data values in the first area of the image frame in accordance with the data values from the at least one second area of the image frame.

BRIEF DESCRIPTION OF THE DRAWINGS

The accompanying drawings, which are incorporated in and constitute a part of the specification, illustrate a presently preferred embodiment and method of the invention and, together with the general description given above and the detailed description of the preferred embodiment given below, serve to explain the principles of the invention. Of the drawings:

FIG. 1 illustrates the "pin cushion" distortion in an image-intensifier based CT system;

FIG. 4 illustrates distortion in a plot representing an image of the distortion measuring object;

DETAILED DESCRIPTION OF THE INVENTION

Reference will now be made in detail to a presently preferred embodiment of the invention as illustrated in the accompanying drawings.

Figure 2:
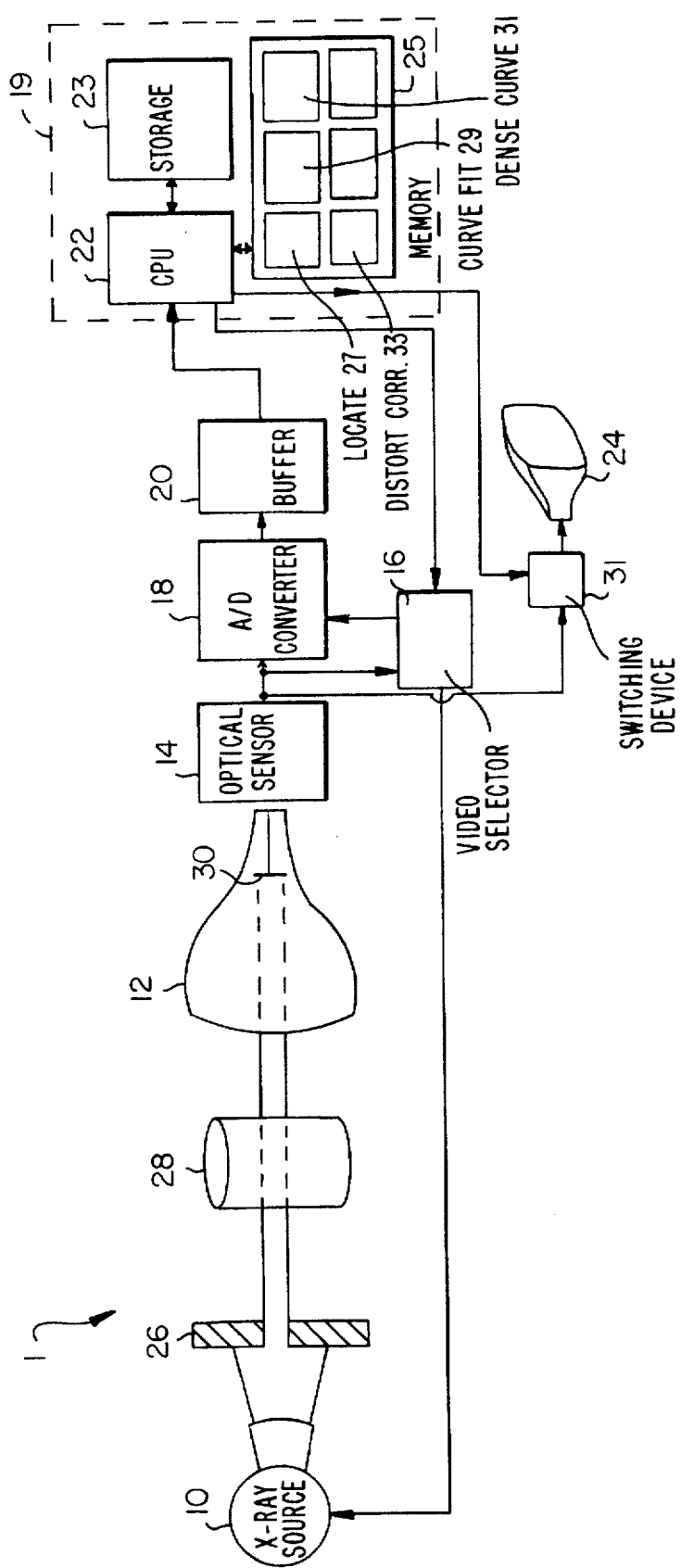
FIG. 2 is a block diagram of a correcting imaging system in accordance with an embodiment of the present invention.

FIG. 2 illustrates a CT imaging system 1 constructed in accordance with an embodiment of the present invention. The CT imaging system includes x-ray source 10; x-ray detector 12; optical sensor 14; video selector 16; analog-to-digital (A-to-D) converter 18; buffer 20; computer 19 which includes CPU 22, data storage device 23, and memory device 25; and display 24. Memory device 25 stores software subprograms for retrieval and execution by CPU 22, designated as a coordinate locator 27, a curve fitter 29, and a coefficient curve fitter 31. Optionally, the system 1 also includes collimator 26. Although buffer 20 is shown as a separate component, more typically buffer 20 constitutes a part of computer 19. An object under test 28 is disposed between x-ray source 10 and x-ray detector 12 in accordance with conventional techniques.

X-ray source 10 can be provided as any conventional source of x-rays suitable for use in a CT imaging system. Source 10 emits a cone of x rays toward the object under test 28. The x rays may be collimated by collimator 26 to select a slice width of the object under test 28, or the entire cone of x rays may be permitted to pass through the object under test 28 to the front or "face" of the x-ray detector 12.

As embodied herein, x-ray detector 12 comprises an image intensifier 12 which converts x-ray photons to optical photons and then converts the photons to electrons. The electrons are focused and accelerated to a phosphor screen 30 contained in the image intensifier 12. The phosphor screen 30 reconverts the electrons back to optical photons to form an image frame of the object under test 28. Preferably, this image frame comprises 525 lines of video information.

The optical sensor 14 records the image information contained in the image frame on the phosphor screen 30. As embodied herein, optical sensor 14 can comprise a camera, a charge coupled diode converter or some other solid state device suitable for recording the image frame from the phosphor screen 30 of the image intensifier 12. In a preferred embodiment, the optical sensor 14 is provided as a vidicon camera such that the recorded image frame contains 525 lines of video information.

Video selector 16, as described in U.S. Pat. No. 5,111,490 issued on May 5, 1992 to Bruce M. Drawert and commonly assigned to Kabushiki Kaisha Toshiba, is provided to select pixels, lines, and frames of video information outputted by the optical sensor 14 for digitization in an A-to-D converter 18. Video selector 16 not only drives that A-to-D converter, but also provides the sampling 10 clock to the converter. With optical sensor 14 provided as a vidicon camera, the A-to-D converter 18 can digitize each of the 525 video lines into 512 pixels of video information. However, the video selector 16 can be controlled by CPU 22 to select the total number of frames of video information to be digitized, the specific frames out of the total number of frames generated during the scan to be converted, the specific lines in each frame to be converted, and the number of pixels in each line to be digitized by the A-to-D converter 18 to provide selected digitized image data. The selection of data reduces the data load on the computer 19. Moreover, in two-dimensional slice reconstruction most of the data in each frame does not need to be processed. If the scan is performed in a medical environment, the radiation dose to the patient is also a concern.

While the radiation dose to the object under test is ultimately controlled by CPU 22, the video selector 16 can also provide a control signal to the x-ray source 10 to provide control over the radiation dose received by the object under test 28. This is particularly important if the object under test is a human being or an animal.

The selected digitized image data outputted by the A-to-D converter 18 is transferred to the buffer 20 for temporary storage before being forwarded to the data computer storage device 23 or memory 25 associated with the CPU 22. In order to increase the speed of data processing, it is preferable to forward the data to the memory 25, if available, rather than to storage device 23. The CPU 22 processes the digitized image data to correct the image data to substantially reduce or eliminate distortion, offsets, veiling glare and scatter in the image frame and to provide CT slice images, digital radiographs, and volumetric CT images which are displayed on display 24.

Computer 19, including CPU 22, can comprise any analog or digital computer or computational device or devices having sufficient memory size and computational speed and ability to carry out the calibration and correcting techniques of the present invention. In a preferred embodiment, computer 19 comprises a personal computer, using an Intel i80386 microprocessor, which may be modified to provide additional processing power as necessary, such as by addition of an Intel i80387 math coprocessor.

In the preferred embodiment and as illustrated herein, display 24 is provided with inputs from both the optical sensor 14 and the CPU 22. A switching device 31 is connected to both the sensor 14 and the CPU 22 and can be switched to determine which source of video input will be displayed. Alternatively, separate displays (not shown) can be provided for separately displaying output video information of the optical sensor 14 and the CPU 22. Circuitry, well known in the art, for driving display 24 with the applied video information is not shown.

The correction of an image frame to substantially reduce or eliminate spatial distortion with apparatus and methods in accordance with a first embodiment of the invention is described next.

The apparatus and methods of the first embodiment of the present invention provide for correction of distortion of an image frame in both the vertical and horizontal directions. In accordance with this embodiment, before generating image frames of the object under test, two scans are performed with the imaging system. In a first scan, an image frame of a distortion measuring object is generated to develop a representation of spatial distortions of the image frames. In a second scan, referred to herein as the background scan, an imaging frame of a background measuring object, a distortion measuring object without the radiopaque objects, is generated under identical conditions. The two resulting data sets are subtracted to produce a data set free of low-frequency intensity variations.

Figure 3:
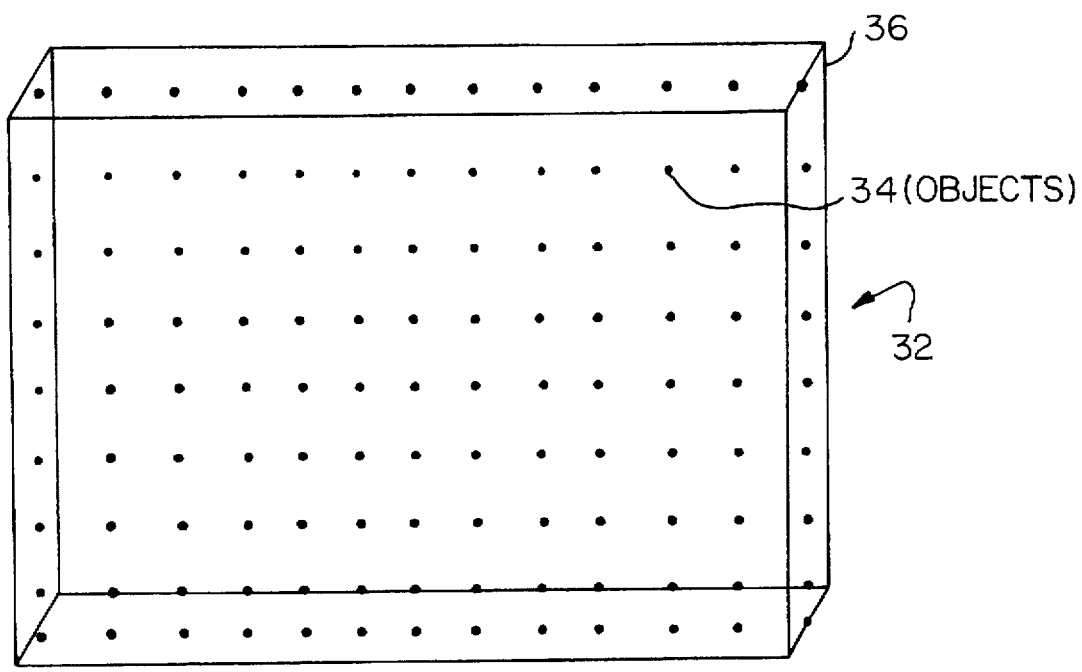
FIG. 3 is a diagram of a distortion measuring object in accordance with an embodiment of the present invention.

FIG. 3 illustrates a distortion measuring object 32, which includes a grid of radiopaque objects 34 that are all the same size and are spaced uniformly in a block 36 of acrylic plastic. The background measuring object (not shown) is identical to the distortion measuring object 32 of FIG. 3 except it does not contain the radiopaque objects 34. As embodied herein, the radiopaque objects 34 can be provided as round metal spheres, such as ball bearings or BBs, or small round metal disks, or any other small objects having a small cross section that will attenuate or remove x rays from the x-ray beam of a CT imaging system. For example, the radiopaque objects 34 are distributed in an orthogonal arrangement of rows and columns, preferably in a common plane, and are contained within the block 36 of acrylic plastic, which is preferably 15–16 inches on each side and ½ inch thick for an image intensifier that is 14 inches in diameter. However, the dimensions of the distortion measuring object 32 and radiopaque objects 34 should be chosen to meet and accommodate the dimensions of the image intensifier 12. Also, the radiopaque objects 34 should be numerous enough and be spaced sufficiently close together to provide an adequate number of data points. For example, the distortion measuring object 32 when provided with block 36 having dimensions of 15 inches on each side, can preferably contain 25 rows and columns of 1.98 millimeter diameter radiopaque objects (BBs) spaced ½ inch apart in horizontal and vertical directions from center to center.

As used herein, in the context of distortion measuring object 32 or data points of an image frame, horizontal means direction from left-to-right or from right-to-left as one views the image frame or object 32 and generally corresponds to a direction lying in a plane parallel to the ground. Vertical means a direction from top-to-bottom or bottom-to-top as one views the image frame or object 32 and generally corresponds to a direction lying in a plane perpendicular to the ground.

The present invention as illustrated and described herein, in accordance with the first embodiment, makes corrections for both horizontal and vertical distortions in an image frame, as can occur in CT imaging systems using either a rotating table (i.e., a turntable) configuration or a rotating gantry configuration. In a turntable configuration, an object under test is rotated on a rotating table with respect to a stationary x-ray source and x-ray detector. In a rotating gantry configuration, the object under test remains stationary with respect to a rotating x-ray source and x-ray detector.

In accordance with the first embodiment of the rotating table configuration, the distortion correction is effected by placing the distortion measuring object 32 on the face of the image intensifier 12 and carrying out the above-noted first scan to generate an image frame of the distortion measuring object 32. The distortion measuring object is then replaced by the background measuring object and the process is repeated to generate an image frame of the background measuring object. The two data sets are subtracted to obtain a data set free of low-frequency intensity variations due to spatial x-ray flux variations, response variations in image intensifier (shading and burn spots) and the attenuation variations caused by the acrylic plastic. Any offset due to scattered x-radiation, veiling glare, and detector system bias is also removed. Alternatively, the distortion measuring object 32 and the background measuring object can be disposed on the turntable (not shown) or indeed anywhere between source and image intensifier. However, in this case, the translation technique utilized to generate the slice image or scan would have to be accommodated for the distance in between the turntable and the image intensifier 12, in accordance with conventional techniques (magnification factor).

In accordance with the second embodiment of the rotating gantry configuration, the procedure described above ideally is repeated for each x-ray source position. Since the distortion is repeatable, in the absence of changing magnetic fields, this need be done only infrequently. In addition, changes during small angular rotations are expected to be small and the distortion correction can be made at fewer positions than the number required for a complete data set with corrections between calibration positions being interpolated from available data. With either the first or second embodiment, many frames (preferably about 100) can be collected at measuring positions and averaged to improve the signal to noise ratio.

FIG. 4 illustrates an exemplary plot 50 of an image frame of the difference between the image of the distortion measuring object 32 and the image of the background measuring object, containing plotted images 52 respectively corresponding to the radiopaque objects 32. The sampled image positions of this image, hereafter denoted as the distorted image, will be identified by the coordinates (x,y). Ideally, if the image of the distortion measuring object 32 were not distorted, the rows of radiopaque objects plotted in images 52 would appear as parallel, horizontal straight lines across the plot 50. Additionally, the columns of radiopaque objects would appear as parallel, vertical straight lines in the plot 50 and the image frame. However, due to magnetic and geometric distortions, the rows and columns of radiopaque object plotted images 52 are distorted, as illustrated. The image that is corrected in accordance with the invention is referred to hereafter as the corrected image frame. In the corrected image frame, the sampled image positions are hereafter identified by the coordinates (X,Y). Sampled image positions in the horizontal rows of the corrected image all have the same coordinate Y. Sampled image positions in the vertical columns of the corrected image all have the same coordinate X.

After a distorted image frame is generated and then digitized by an A-to-D converter 18, it is stored in storage device 23 and read into memory device 25. Software subprograms stored in memory 25 include the coordinate locator 27, the curve fitter 29, the coefficient curve fitter 31, and the distortion corrector 33. The CPU 22 retrieves and executes these subprograms in order to further process the distorted image frame data. While these subprograms appear in the computer memory 25 in FIG. 2, it would be obvious to one skilled in the art to have these programs loaded into the computer memory from a disk drive, tape drive, a chip, or in any other suitable manner.

Figure 5:
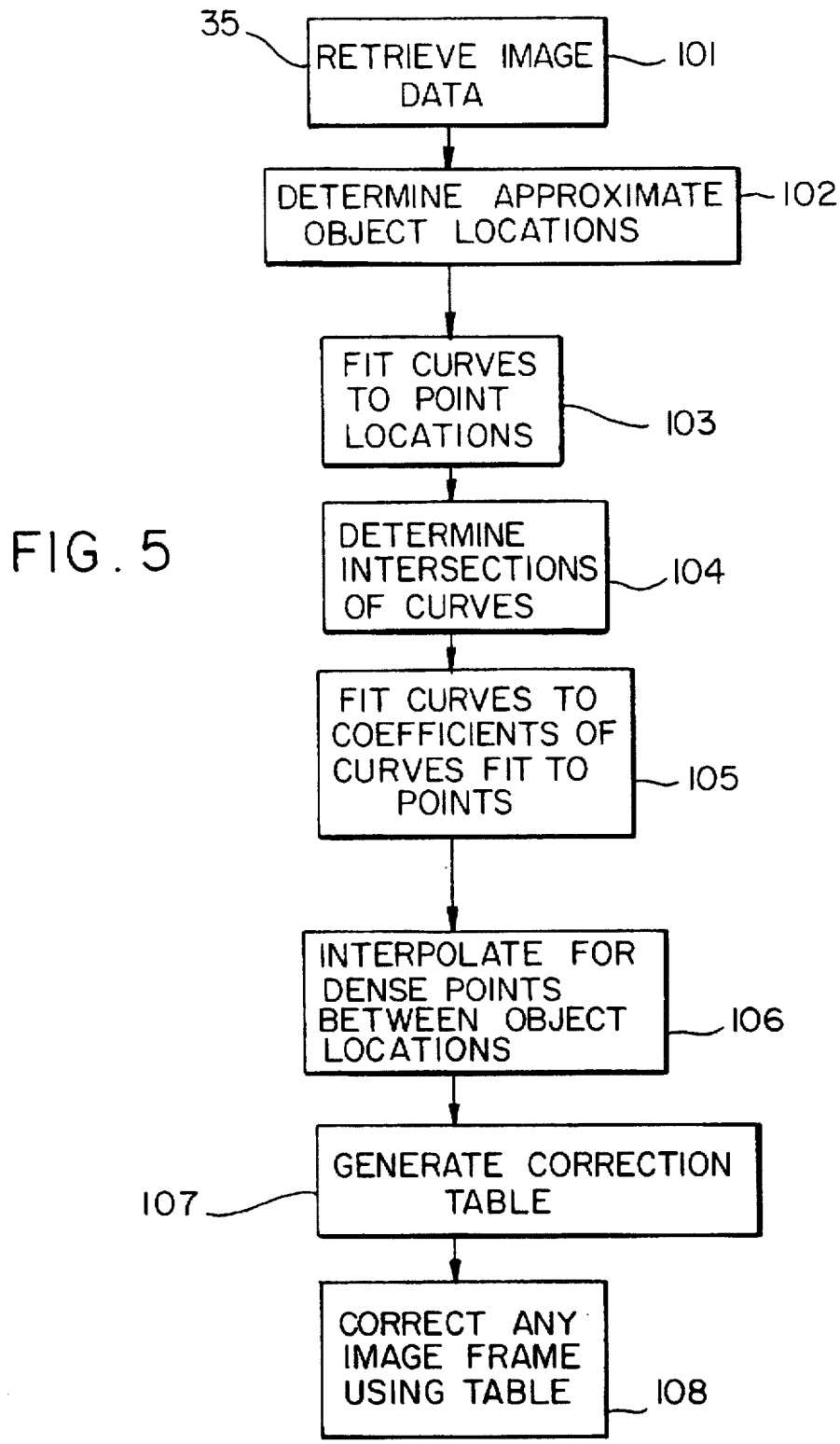
FIG. 5 is a flow chart illustrating a correction scheme for spatial distortion.
Figure 6A:
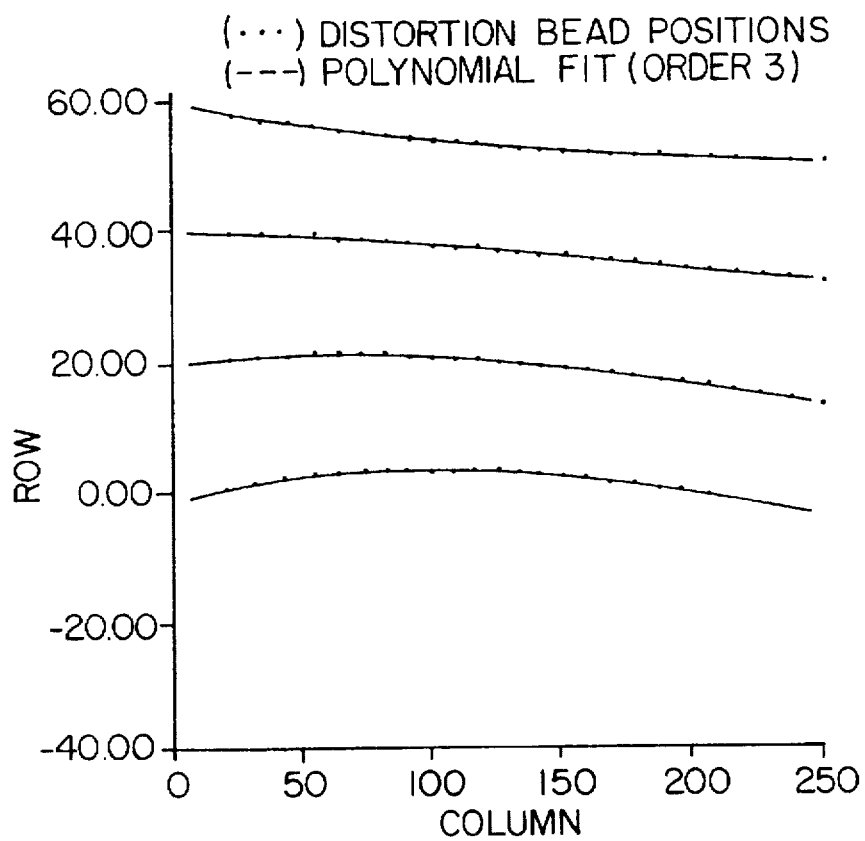
FIGS. 6a–6e illustrate third order polynomial fits to approximate representations of rows and columns of point attenuators in an image frame.
Figure 7:
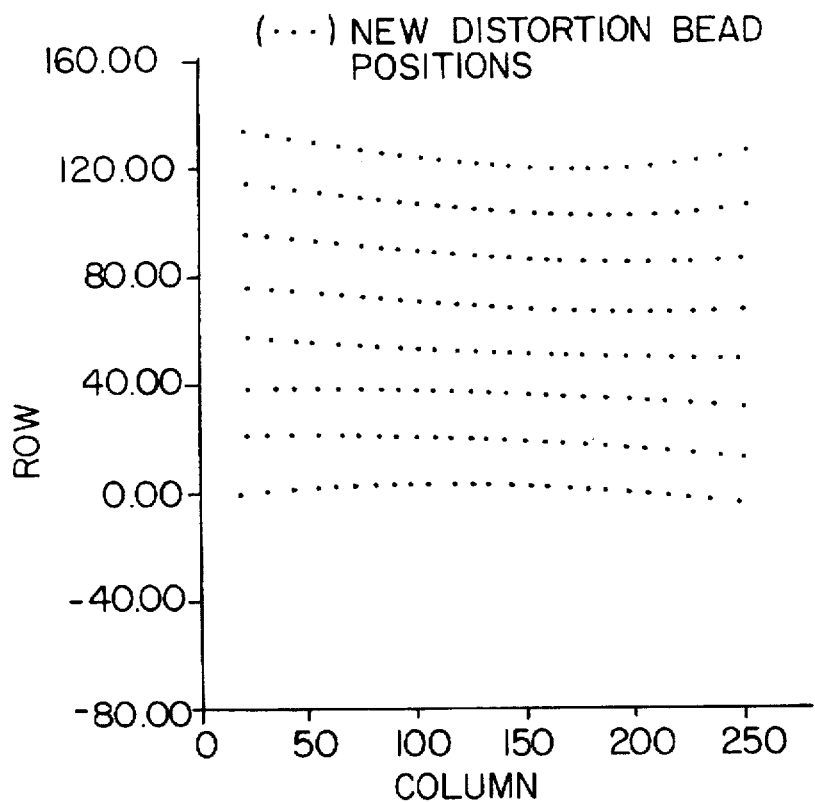
FIG. 7 illustrates refined point locations of representations in an image frame determined from intersections of curves fit to approximate locations of point attenuators.
Figure 6B:
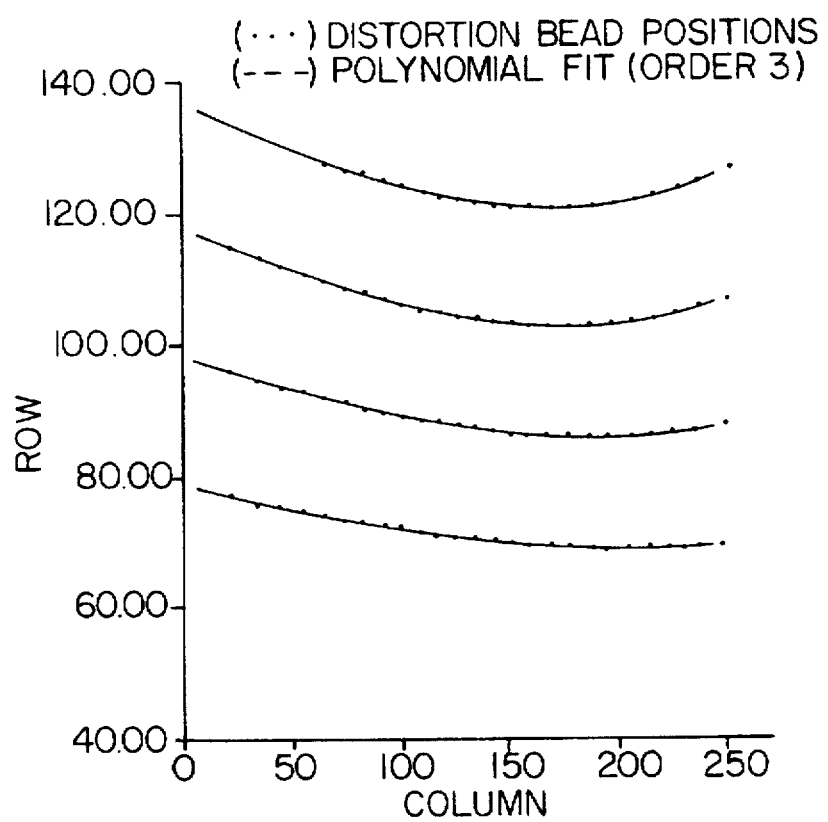
Figure 6C:
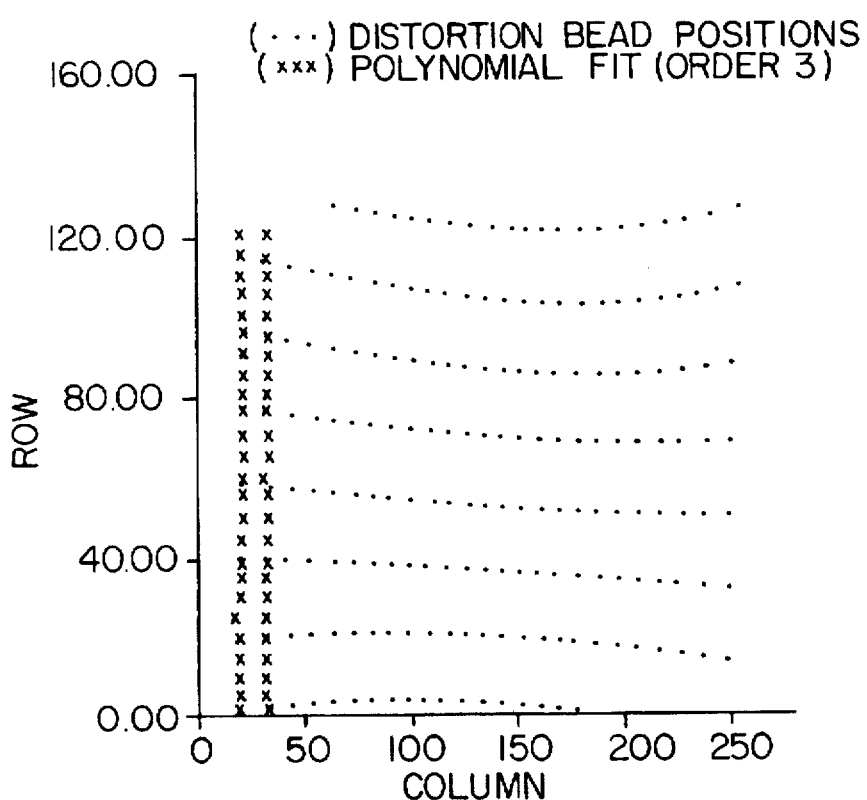
Figure 6D:
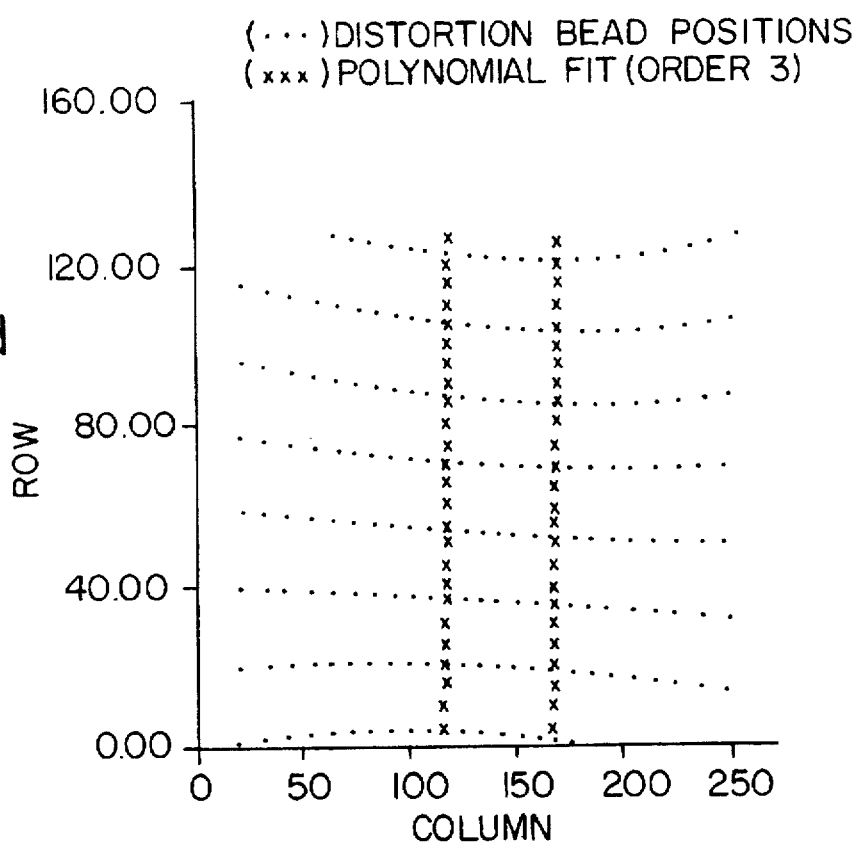
Figure 6E:
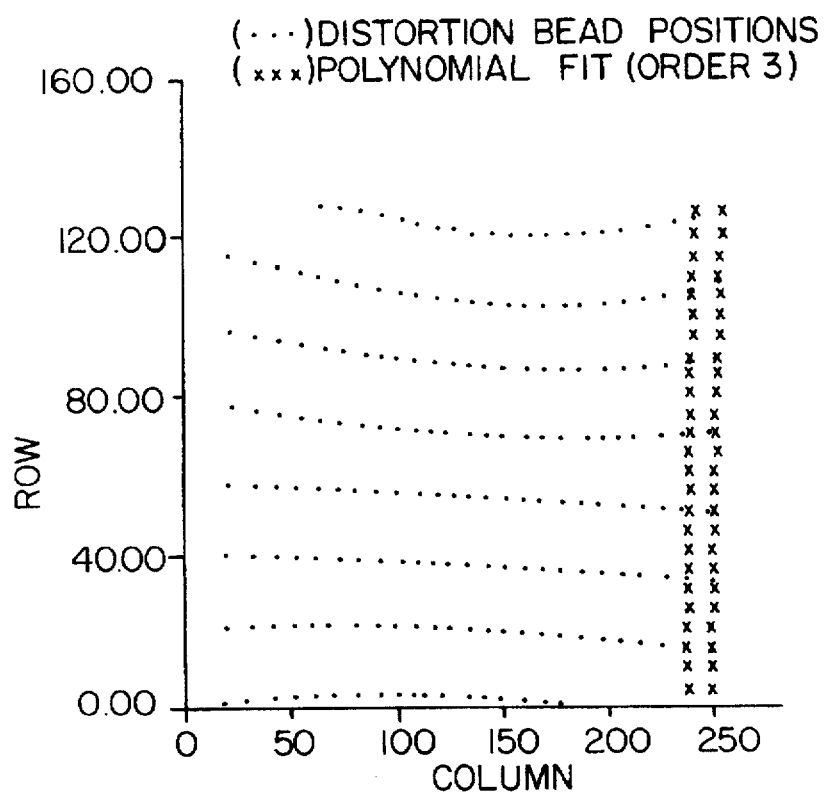

FIG. 5 illustrates a flowchart 35 showing a method preferably performed by the CPU 22 during execution of the coordinate locater 27, curve fitter 29, coefficient curve fitter 31 and distortion corrector 33 subprograms to correct the distortions in a distorted image frame. As shown in flow chart 35, at step 101, the CPU generally retrieves the image data of the distorted image frame, previously processed to remove systematic biases and averaged to improve signal-to-noise ratio, for further processing as required during execution of the subprograms. Next, at step 102, the CPU 22, preferably executing coordinate locator 27, reads data from the disk into memory 25 and locates the approximate coordinates (x,y) of the representations of the radiopaque objects 34 in the distorted image frame data.

The CPU 22, executing curve fitter 29, having the number of rows and columns of radiopaque objects, and having the numbers of columns and rows in the distorted image frame, determines how many rows and columns of pixels there should be in the corrected image. For example, if there are NC columns of radiopaque objects and LX columns of pixels in the distorted image, there are NCD columns of pixels in the corrected image where NCD is defined by equation (2).

$$NCD = (NC - 1) * \text{Truncate}\left[\frac{LX}{NC - 1}\right] + 1 \quad (2)$$

Having determined that there are NCD columns of pixels in the corrected image, the curve fitter 29 determines which columns of pixels in the corrected image will contain the radiopaque objects and identifies these columns by their respective X coordinates. Likewise, if there are NR rows of radiopaque objects and LY rows of pixels in the distorted image, there are NRD rows of pixels in the corrected image where NRD is defined by equation (3).

$$NRD = (NR - 1) * \text{Truncate}\left[\frac{LY}{NR-1}\right] + 1 \tag{3}$$

Having determined that there are NRD rows of pixels in the corrected image, the curve fitter 29 determines which rows of pixels in the corrected image will contain the radiopaque objects and identifies these rows by their respective Y coordinates.

Next, in step 103, the CPU 22, preferably executing curve fitter 29, using the approximate coordinates of the representations of the radiopaque objects 34 as determined when executing the coordinate locator 27, fits a first plurality of curves to the representations of the radiopaque objects 34 in the image frame. The first plurality of curves is also referred to herein as a first set of curves. Examples of equations that can be used to fit the first set of curves to each row and column of the representations of the radiopaque objects 34, are given by the third-order polynomial curves in equations (4a) and (4b). However, one skilled in the art could use any analytic approximate curve method. Here the coefficients of the polynomial terms are expressed as functions of the X and Y coordinates of the rows and columns respectively of the radiopaque objects 34 in the corrected image.

$$x=l(X)+m(X)y+n(X)y^2+p(X)y^3 \text{ (COLUMN)} \tag{4a}$$

$$y=a(Y)+b(Y)x+c(Y)x^2+d(Y)x^3 \text{ (ROW)} \tag{4b}$$

An exemplary first set of third-order polynomial curves are shown in FIGS. 6a–6e. The coefficients (l(X), m(X), n(X), p(X), a(Y), b(Y), c(Y), and d(Y)) of equations (2) and (3) for each row and column of radiopaque objects, as computed by the CPU 22 when executing the curve fitter 29, are stored in the storage device 23. The number of coefficients that are stored is 4*(NC+NR).

At step 104, the CPU 22, by executing curve fitter 29, then locates the NC*NR intersections, in the coordinate form (x,y), of all of the NC column curves with all of the NR row curves fitted in step 103. In the example given, where the curves are fit using third-order polynomials, the polynomial equation (5) given below, results from solving equations (4a) and (4b) simultaneously to eliminate the x coordinate as a variable. Here, the X or Y dependence of the coefficients is understood, but not explicitly stated.

$$0 = (a + bl + cl^2 + dl^3) + (bm + 2clm + 3dl^2m - 1)y + \tag{5}$$
$$(bn + c(m^2 + 2ln) + 3dl(nl + m^2))y^2 +$$
$$(bp + 2c(lp + mn) + d(m^3 + 6lmn + 3l^2p))y^3 +$$
$$(c(n^2 + 2mp) + 3d(ln^2 + 2lmp + m^2n))y^4 +$$
$$(2cnp + 3d(mn^2 + 2lnp + m^2p))y^5 +$$
$$(cp^2 + d(n^3 + 6mnp + 3lp^2))y^6 +$$
$$3dp(mp + n2)y^7 + 3\,dnp^2y^8 + dp^3y^9.$$

In accordance with step 104, for the first set of curves, in order to find the intersection for a given column and row, the curve fitter 29 finds the root of the polynomial equation (5) that corresponds to the y value of the intersection in the distorted image. In a preferred embodiment, the curve fitter 29 is implemented using an iterative method for locating the intersection, such as the Newton-Raphson method, which is known to those skilled in the art. The approximate y coordinates for the radiopaque object representations found by the CPU 22, executing the coordinate locator 27 in step 102, are used as initial guesses in the equation. The x coordinate of the intersection is then determined by substituting in Equation (4a) the determined y coordinate and the same coefficients used in determining the y coordinate. The process is repeated to determine the NR*NC x and y coordinates of the intersections of the curves fit to the rows and columns of the radiopaque object representations in the distorted image. FIG. (7) illustrates a plot of the coordinates of intersections, computed in step 104, of the first set of curves for the respective rows and columns. These intersection points are referred to herein as the "new refined radiopaque object representation positions", which are stored in the storage device 23.

With reference to FIG. 5, the method proceeds next to step 105 of the flowchart 35, in which the CPU 22, preferably executing the coefficient curve fitter 31, reads the coefficients of the first set of curves found by the curve fitter device 29 in step 103. The CPU 22 is also provided with an input of the X or Y coordinates of these coefficients.

Figure 8A:
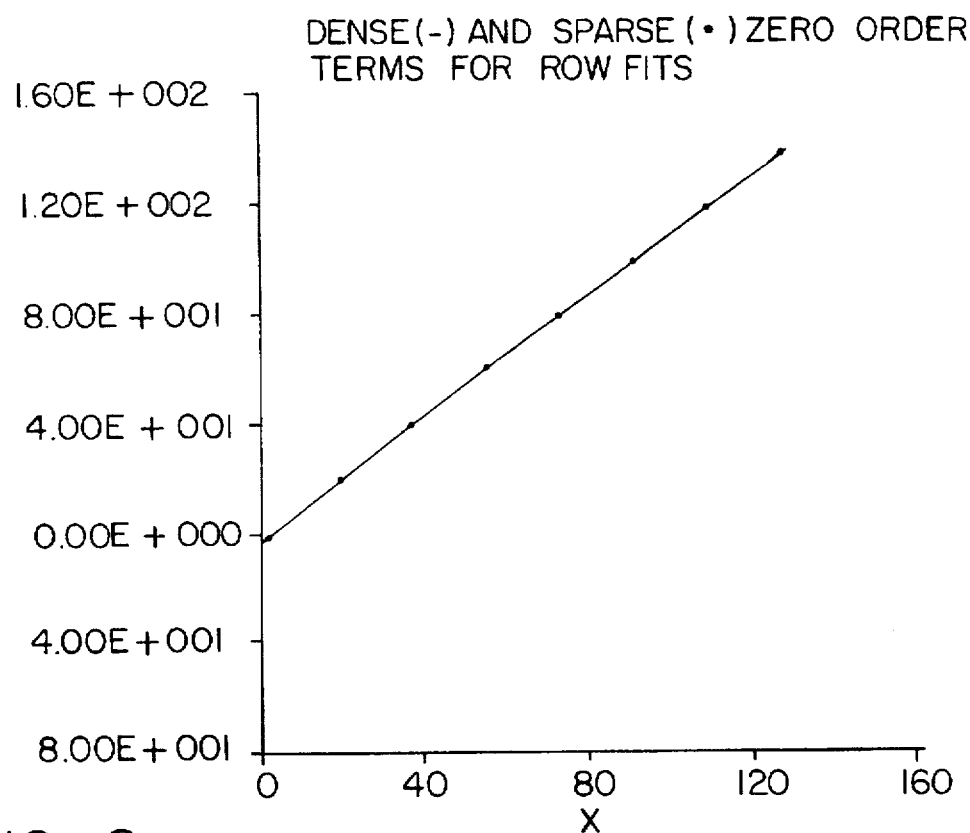
FIGS. 8a–8d illustrate curves fit to coefficients for the curves illustrated in FIG. 6.
Figure 8B:
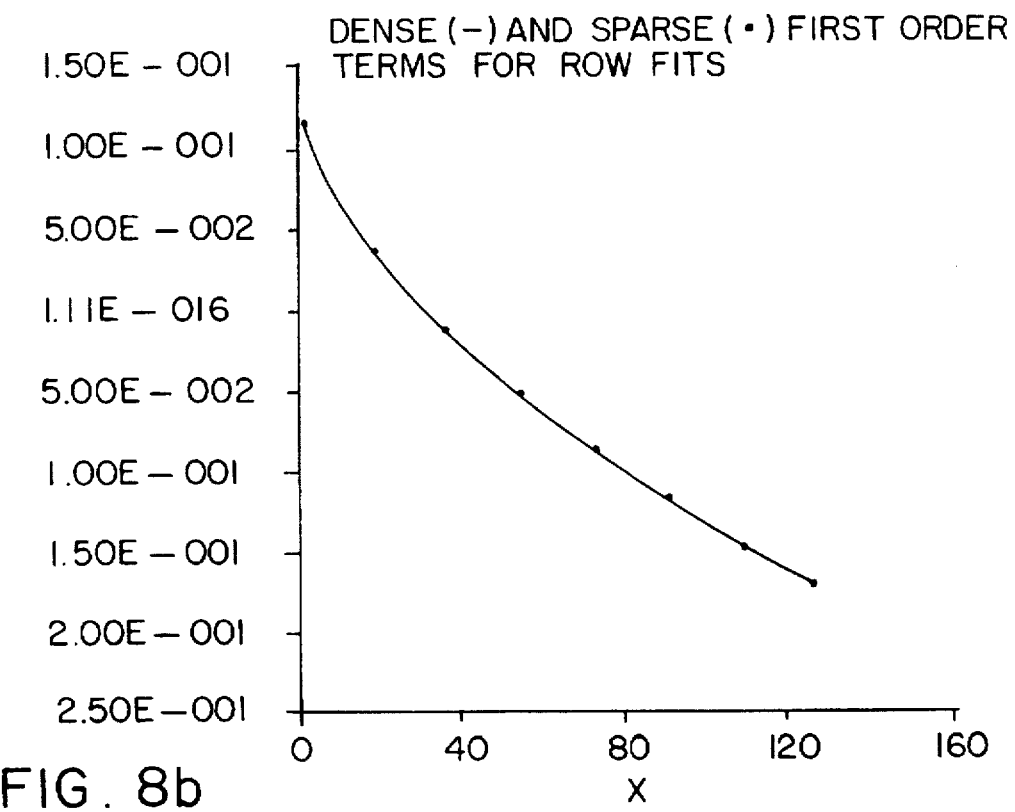
Figure 8C:
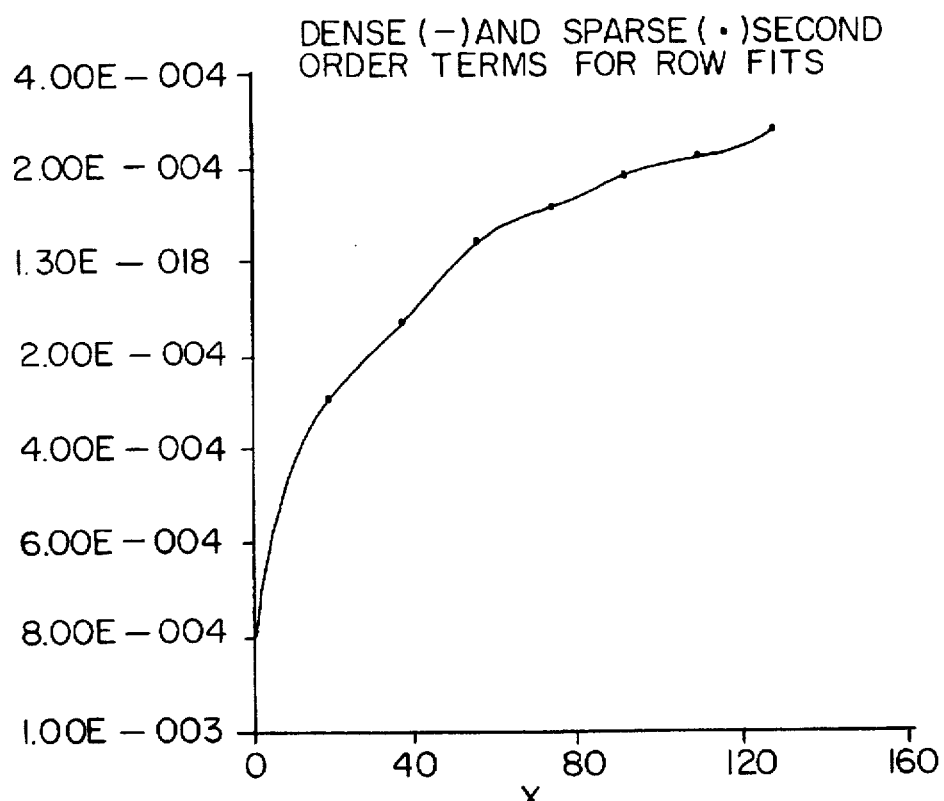
Figure 8D:
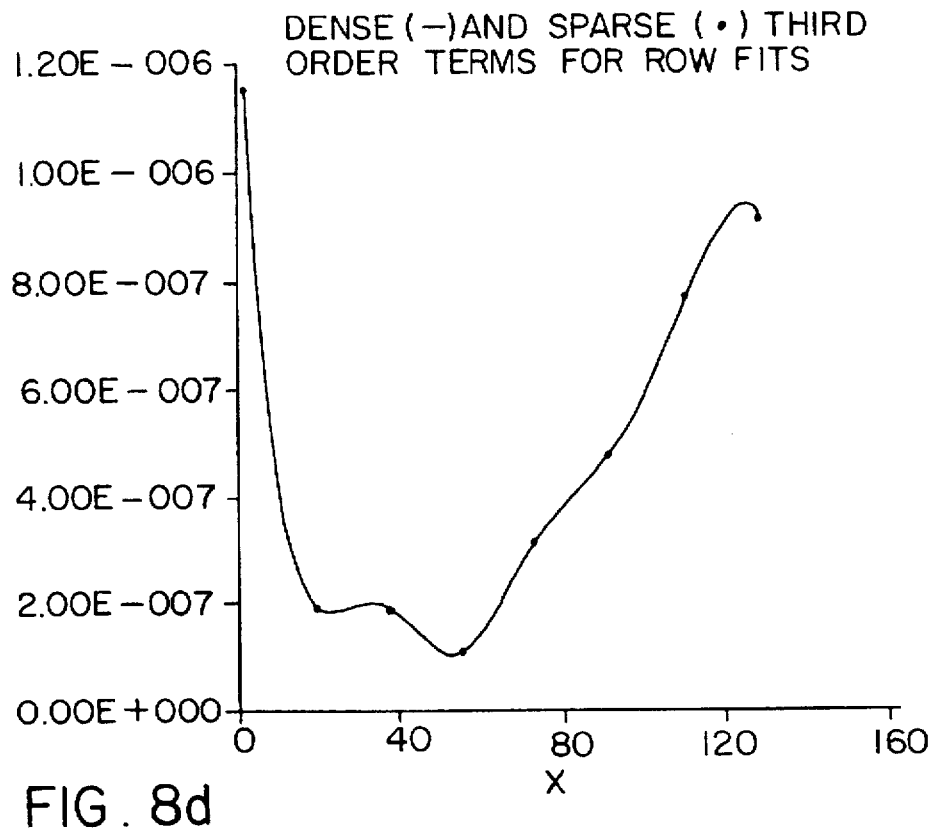

Still with respect to step 105, the CPU 22, executing coefficient curve fitter 31, then fits a second plurality of smooth curves, also referred to herein as a second set of curves, to the coefficients of the first set of curves, determined in step 103 when executing the curve fitter 29, as functions of the coordinates X and Y of the corrected image. Examples of a second set of smooth curves that have been fit using fifth-order splines to the respective coefficients of a first set of curves described by row equations (4b) are shown in FIGS. 8a–8d. FIG. 8a illustrates the zero-order coefficients a(Y) for respective row equations (4b) plotted as functions of Y. The points on the curve represent zero-order "a(Y)" coefficients found by the curve fitter 19 for the first set of curves in step 103 of flowchart 35. The lines between the points are the smooth curves fit by the CPU 22 using coefficient curve fitter 31. FIGS. 8b–8d illustrate curves fitted to plots of the first-order, second-order and third-order coefficients (b(Y), c(Y), and d(Y)), respectively. Likewise, a second set of smooth curves is fit, using fifth-order splines in the preferred embodiment, to the respective coefficients (l(X), m(X), n(X), and p(X)) of a first set of curves described by column equations (4a).

By fitting a second set of curves to the coefficients of the first set of curves, a third plurality of curves can be generated for additional rows and columns in the distorted image that are intermediate between the respective coefficients of the first set of curves in the distorted image found by the curve fitter 29 in step 103. The third plurality of curves is also referred to herein as a third set of curves. At step 106 of the flowchart 35 (FIG. 5), the third set of curves is defined by determining the coefficients of equations (4a) and (4b) for all integral values of the coordinates (X,Y) of the corrected image. With the second set of curves having been fit as functions of X and Y to the coefficients of the first set of curves, the CPU 22 is now able to determine two curves (equations (4a) and (4b)) for each pair of coordinates (X,Y) in the corrected image frame, the intersection of which identifies the corresponding pair of coordinates (x,y) in the distorted image frame. Using the appropriate coefficients in equations (4a) and (4b), the computer then solves the equations to find the intersection points that are interposed between the "new redefined positions" and thereby define a complete set of NCD*NRD dense points (x,y) in the distorted image that correspond to the NCD*NRD dense points (X,Y) in the corrected image.

As shown in step 107 in flowchart 35 (FIG. 5), the CPU 22, executing coefficient curve fitter 31, then generates a correction table consisting of coordinates, in the format (x(X,Y),y(X,Y)) from which the correct intensity value at each point (X,Y) in the corrected image may be determined. A dense point data file is defined in storage device 23 to include NCD (defined in Equation 2) columns and NRD (defined in Equation 3) rows.

The correction of an object under test 28 is then performed in step 108 of flowchart 35 (FIG. 5) by the CPU 22, preferably executing distortion corrector 33. In the preferred embodiment, the correction table contains coordinates in x(X,Y) and y(X,Y) format that indicate, for each of the pixels in the corrected image frame, where in the distorted image frame the correct image intensity value can be found. Thus, for each pixel (X,Y) in the corrected image frame, the CPU (22) looks up in the correction table the coordinates x(X,Y) and y(X,Y) that identify the appropriate image intensity value in the distorted image. In the preferred embodiment, the correction table contains only pairs of coordinates x(X,Y) and y(X,Y), and not image intensity values. The coordinate pairs need not be whole numbers, and are more likely to be fractional values (e.g., 94.3, 102.6, etc.). The data value corresponding to the coordinates in the correction table is determined by bilinear interpolation of the image intensity values in the original, distorted image. According to one embodiment, the value may be found according to equation (6).

$$\text{OUTPUT}(X,Y) = (1-fy)*\{fx*(\text{INPUT}(ix+1,iy) - \text{INPUT}(ix,iy)) + \text{INPUT}(ix,iy)\} + fy*\{fx*(\text{INPUT}(ix+1,iy+1) - \text{INPUT}(ix,iy+1)) + \text{INPUT}(ix,iy+1)\} \quad (6)$$

Where:
OUTPUT(X,Y)=Intensity value at column X, row Y for corrected image
INPUT(ix,iy)=Intensity value at column ix, row iy for original distorted image;
x=Table-value(X,Y,1) (floating point);
Y=Table-value(X,Y,2) (floating point);
ix=integer part of x;
fx=fractional part of x;
iy=integer part of y; and
fy=fractional part of y.

Figure 9B:
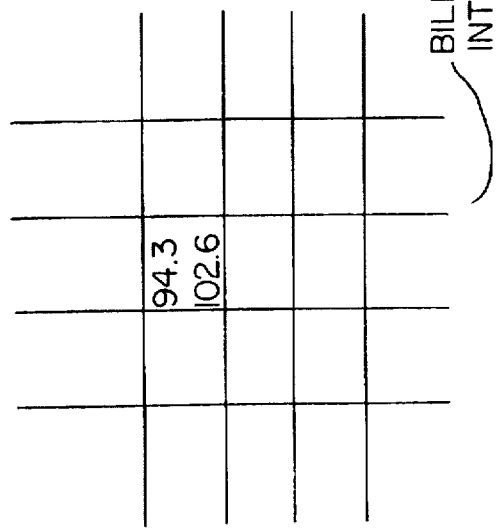
FIGS. 9a–9b illustrates the method and use of the correction table in accordance with the first embodiment.
Figure 9A:
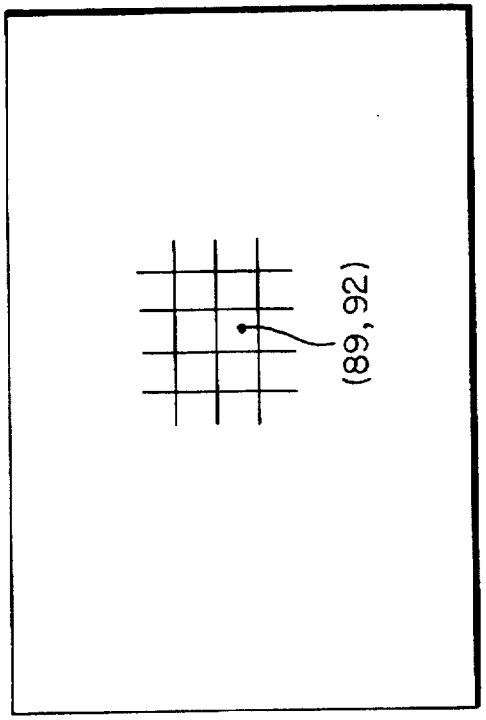

An example of the correction method is provided next and illustrated in FIG. 9. It is assumed that the correction table indicates that the correct intensity value for the pixel located in the corrected image frame 37 at (X,Y)=(89,92) corresponds to the data value located at (x,y)=(94.3,102.6) of the distorted image. The distortion corrector 33 then sums the appropriately weighted values of the intensities of the distorted image INPUT(94,102) (28%), INPUT(95,102) (12%), INPUT(94,103) (42%), and INPUT(95,103) (18%), to determine the intensity value of the pixel at (X,Y)=(89,92) in the corrected image. This process is repeated for each pixel at (X,Y) in the area of interest in the corrected image frame. If the corrected image frame is to be used in single-slice CT, then only an area of interest need be corrected. If, however, the image frame is to be used for volume CT, then the entire image frame of NCD*NRD points is corrected.

This correction process is repeated for each of the distorted image data frames used to compose a CT image. Preferably, this process is performed in real time.

The data values in the corrected image frame can be displayed as a sinogram. However, more typically, these data values are further processed in accordance with CT techniques to generate the images of the object under test. As embodied herein, the inverse Radon transform implemented using the convolution-backprojection algorithm is utilized to transform the data values to image form for two-dimensional CT or a cone beam algorithm such as the Feldkamp algorithm for three-dimensional CT. However, any conventional reconstruction technique may be utilized to transform the data to image form for display.

Ideally, in order to produce high quality CT images, the signals used for displaying an image of the object under test 28 should represent only the transmission of x rays through the scanned object along straight paths extending from the x-ray source 10 through the object under test 28 to the detector 12. However, offsets, veiling glare, and scattered x rays (hereinafter referred to as "extraneous signals") handicap the ability to produce high quality CT images by contributing to the signals in a manner that degrades the CT image.

CT systems normally produce a two-dimensional slice that is typically only several millimeters wide. Therefore, the signals from only a thin band across the face of the image intensifier 12 are of interest in slice CT. The data values from the areas outside this thin band contain contributions due only to the extraneous signals, but, because of the collimator 26, they contain no contributions due to the primary x-ray beam, i.e., the undeflected beam, as shown in FIG. 2.

Figure 10:
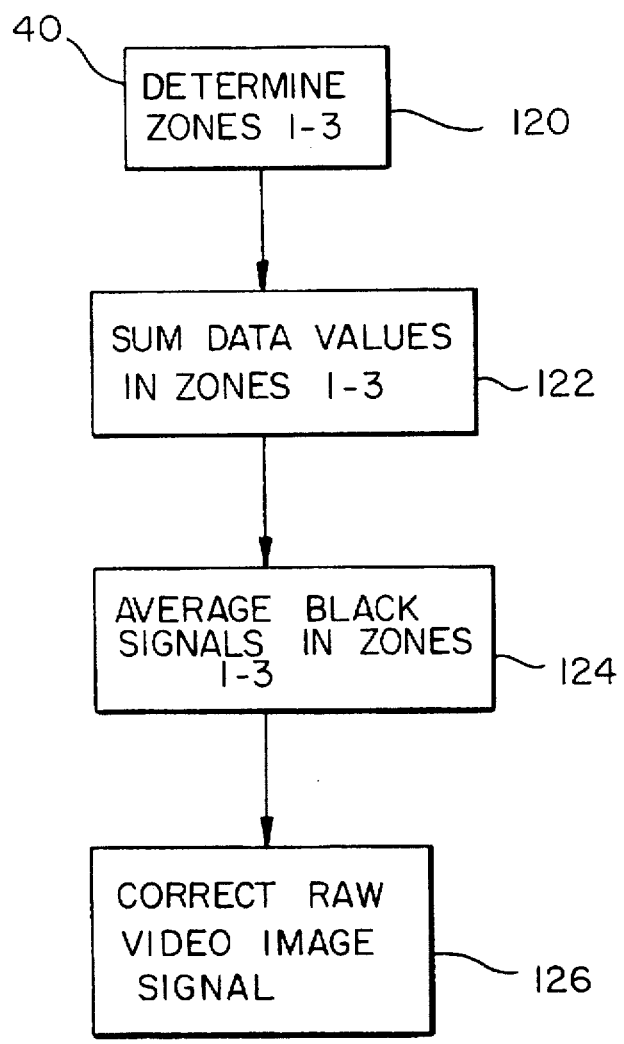
FIG. 10 is a flow chart illustrating a correction scheme for offsets, veiling glare, and scatter.

In accordance with a second embodiment of the invention, relating to a two-dimensional slice, the image frame data values from the areas adjacent to the thin band are used to measure the effect of the extraneous signals on the image frame data values in the thin band across the face of the image intensifier where the primary beam impinges. Then, the measured effect of the extraneous signals is effectively subtracted from the data values corresponding to the thin band of interest to provide a corrected image frame in which the effects of the extraneous signals is substantially reduced or eliminated. FIG. 10 illustrates a flowchart 40 of steps in accordance with the second embodiment by which such a corrected image frame is produced.

Figure 11:
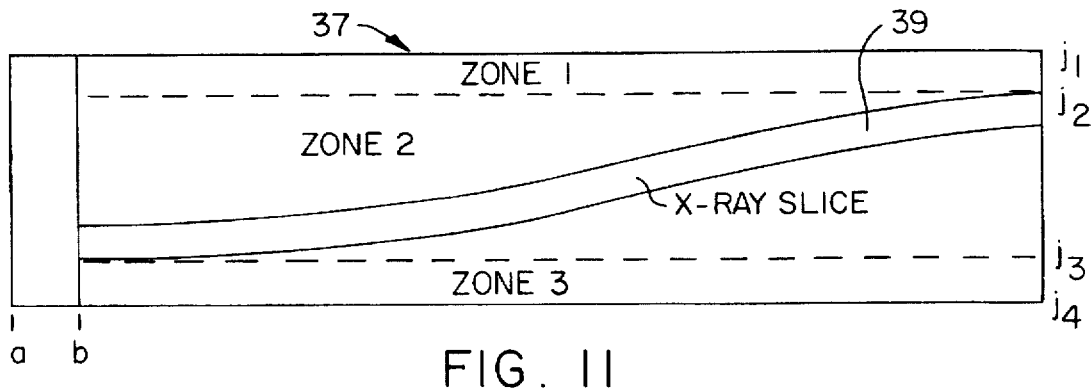
FIG. 11 illustrates zones, independent of image column points, of an image frame used to determine offsets, veiling glare and scatter in accordance with an embodiment of the present invention.

In accordance with the second embodiment of the invention and also with reference to FIG. 11, an image frame 37 is horizontally divided into three different zones, i.e., zone 1, zone 2, zone 3, at pixel row locations $j_1$, $j_2$, $j_3$ and $j_4$, with the result that each zone is rectangular in shape (step 120 in FIG. 10). Methods for defining row locations $j_1$, $j_2$, $j_3$ and $j_4$ to divide image frame 37 are described below. Zone 1 extends from $j_1$ to $j_2$-1, and zone 3 extends from $j_3$ to $j_4$. Zones 1 and 3 contain data corresponding only to the extraneous signals. Zone 2, which extends from $j_2$ to $j_3$-1 is defined to be wide enough to contain all video lines which include a region 39 containing data in the thin band of interest, i.e., from the primary beam. X-ray slices may appear distorted because of the distortion effects described with respect to the first embodiment of the invention.

Next, at step 122 in FIG. 10, the computer 19 computes a sum of data values in each of the three zones on a column-by-column basis. More particularly, the computer 19 computes a sum of the data values contained in zone 1, as defined in FIG. 11, according to equation (7):

$$S_1(i,k) = \sum_{j=j_1}^{j_2-1} R(i,j,k) \quad (7)$$

where
$S_1$ (i,k) is sum of data values in zone 1;
R (i,j,k) is the raw video signal;
i labels the video-frame;
j labels the video-line; and
k labels the video column.

The computer 19 similarly computes sums $S_2$ (i,k) and $S_3$ (i,k) of the data values contained in zones 2 and 3. According to the following equations (8) and (9), respectively:

$$S_2(i,k) = \sum_{j=j_2}^{j_3-1} R(i,j,k) \qquad (8)$$

and $$S_3(i,k) = \sum_{j=j_3}^{j_4} R(i,j,k) \qquad (9)$$

Next at step 124 (FIG. 10), the computer 19 also computes a black signal average corresponding to the signal in the back porch of the video signal (FIG. 12) for each of zones 1, 2 and 3 according to equation (10):

$$S_m^o(i) = \frac{1}{b-a+1} \sum_{k=a}^{b} S_M(i,k) \text{ for } m = 1, 2, \text{ and } 3 \qquad (10)$$

where a and b span the back porch; and m corresponds to the zone number, i.e., m=1 for zone 1, m=2 for zone 2, and m=3 for zone 3.

Figure 12:
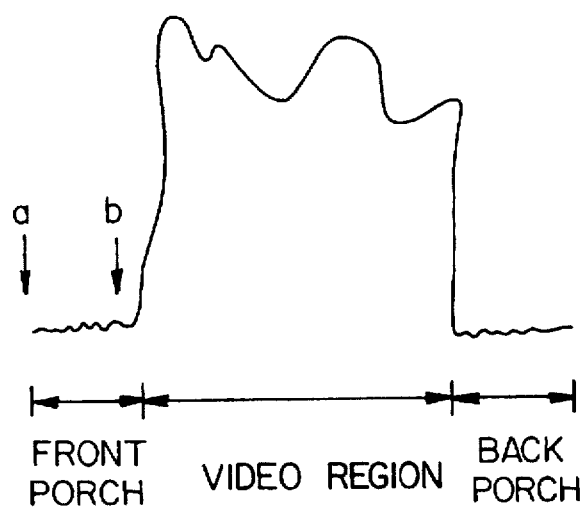
FIG. 12 illustrates a graphic representation of a video signal.

As shown in FIG. 12, and as used herein, the front porch region of the video signal corresponds to the time that the electron gun in the video display 24 is off and resets itself to make another sweep across the screen. The computer 19 then computes a correction of the raw video signal for zone 2, as shown in step 126 of flowchart 40, in order to eliminate the effect of the extraneous signals, by use of the following equation (11):

$$R'(i,k) = S_2(i,k) - S_2^o(i) \qquad (11)$$
$$- \frac{j_3 - j_2}{j_2 - j_1 + j_4 - j_3 + 1} \{S_1(i,k) - S_1^o(i) + S_3(i,k) - S_3^o(i)\}$$

where R' (i,k) is the corrected video signal in zone 2. Equation 11, used for correcting two dimensional slice CT images, is a function of only video frame (i) and video column (k) because the region of interest, zone 2, is reduced to a single row projection in the reconstruction algorithms.

The black signal averages, $S_m^o(i)$'s, correct for offset drift in time of the video camera. In equation (11), the multiplier term immediately preceding the bracketed portion ensures that zones 1-3 are weighted properly.

In order to find the divisions between the three zones, either of two methods is preferably used. In accordance with the first method, a test scan is performed to determine the width of the primary x-ray beam. The user then chooses the pixel rows of the image frame, i.e., $j_1$, $j_2$, $j_3$ and $j_4$, used to divide the image frame into zones 1-3. Subsequent scans and corrections of image frames of objects under test 28 are then performed using the row numbers chosen by the user.

In accordance with the second method, the computer 19, beginning with the row at the top of the image frame, checks the data values in each pixel (i.e., each column) in each successive row, progressing toward the bottom of the image frame, until it locates a row in the image frame with a pixel value in any column of the image frame that exceeds a predetermined value set by the user. The number of that row, which would be the smallest row number above the predetermined value, in the image frame is stored as $j_2$.

The computer 19 then finds the last row in the image frame in which a data value exceeds the same predetermined value. The number of that row, which would be the largest row number above the predetermined value, is stored as $j_3$. The computer 19 then uses the determined values of $j_2$ and $j_3$ to define rectangular zones 1-3. Zone 1 extends from row $j_1=0$, or any row $j_1$ chosen by the user or computer between row 0 and $j_2$, to the row $j_2$ which was determined by the computer to divide zones 1 and 2. The location of row $j_4$ which defines the width of zone 3 along with row $j_3$ is determined in a similar manner. For example, the computer can define zone 3 to extend from $j_3$ to the last row in the image frame, i.e., between $j_3$ and row $j_4=512$, or any row $j_4$ between $j_3$ and row 512. It is important to note that each of the zones may not be, and usually are not, the same width.

In an alternative embodiment in which a solid state device is used as the optical sensor 14 to record the image frame rather than a video camera, the image data would not include a black signal component, i.e., a back porch. Therefore, the black signal average terms $S_m^o(i)$ would not be present in equation (11).

Figure 13:
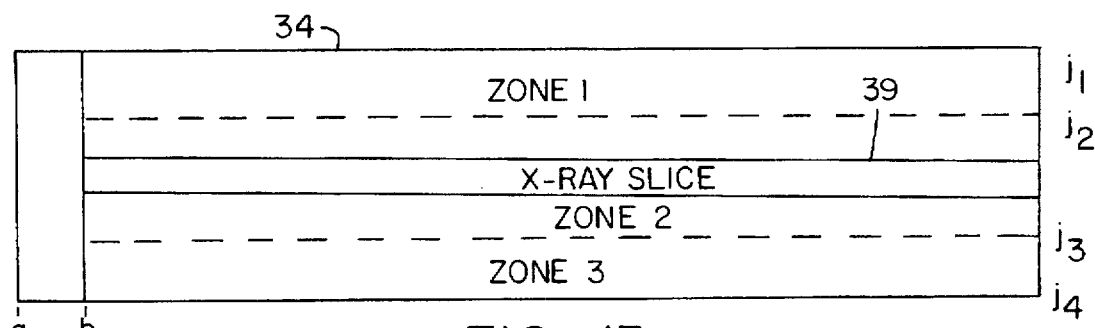
FIG. 13 illustrates zones of an image frame used to determine offsets, veiling glare, and scatter after spatial distortion has been corrected.

The above-described spatial distortions, both magnetic and geometric, inherent in an image intensifier complicate the ability to correct an image frame for the effects of the extraneous signals. The spatial distortion in the image frame causes zone 2 to be larger than it would be if there were no spatial distortion. As a result, if spatial distortion is not corrected initially, the computer makes corrections for the extraneous signals, to a larger amount of data for distorted images than for undistorted images. Therefore, in an alternate version of the second embodiment, the spatial distortions in the image frame, as described above, are first corrected before the extraneous signals are corrected. FIG. 13 illustrates the division of the image frame 37 in accordance with such an alternative embodiment in which spatial corrections are initially made to the image frame, thus allowing the operator and/or the computer 19 to better define each of zones 1-3 in the image frame and makes it possible for the widths of all three zones to be smaller. The result of this process is that less data processing is required to correct the image frame 37 for the extraneous signals.

Figure 14:
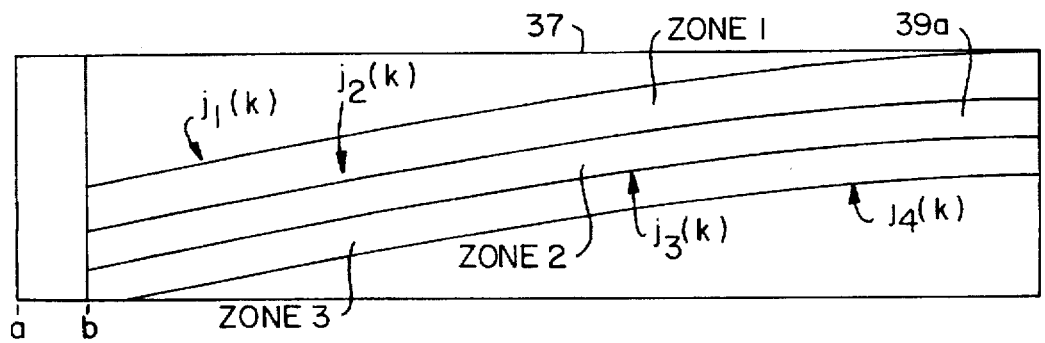
FIG. 14 illustrates zones, as a function of image column points, in an image frame used to determine offsets, veiling glare and scatter in accordance with an embodiment of the present invention.

FIG. 14 illustrates the division of the image frame 37 in accordance with an alternate version of the second embodiment. In this alternate embodiment, the computer separately determines each edge of the primary beam, corresponding to the thin band of interest and zone 2, in each column of the image frame by use of a predetermined value as discussed above. The computer then determines two zones which are of substantially constant width, on either side of the primary beam for zones 1 and 3. Therefore, in this embodiment, the zones used to determine the contributions of the extraneous signals, zones 1 and 3, are directly adjacent to and are shaped similarly as zone 2, which contains information from the primary beam and extraneous signals. Moreover, the respective widths of zones 1 and 3 are independent of column. To achieve this result, the computer first finds the zone boundaries $j_2(k)$ and $j_3(k)$, which define zone 2, before finding the zone boundaries $j_1(k)$ and $j_4(k)$, where k is the column number in the image frame. Thus, the boundaries of the three regions are a function of the image frame column numbers, i.e., $j_1(k)$, $j_2(k)$, $j_3(k)$ and $j_4(k)$. This method results in zones in which the image frame row number ($j_m(k)$), that defines the top and bottom of the zone, is not the same for each column. For example, in FIG. 14, the row number of zone boundary $j_1(k)$, i.e., the top of zone 1, in column 12 may be 100 and in column 200 the row number would be 20, but the width of each zone is the same independent of column, i.e., $j_2(k)-j_1(k)$, $j_3(k)-j_2(k)$, etc. are constants.

In accordance with the alternate embodiment illustrated in FIG. 14, the computer's ability to determine boundaries as a function of columns and zones of a predetermined width reduces the amount of data that must be processed by the computer to better enable a real time correction of image data.

In accordance with a third embodiment of the invention, the image frame produced by a CT imaging system is corrected for the effect of offsets. As noted above, in a preferred embodiment of the invention, optical sensor 14 is provided as a saticon camera, which is a form of video camera. When a video camera views a black scene, i.e., one in which there is no light entering the camera, the video camera generates a signal that is not necessarily zero. The signals from a video camera viewing a black scene can vary from frame to frame, and from TV-line to TV-line even within a single frame. Such video signals from a camera viewing a black scene are called "offsets."

Figure 15:
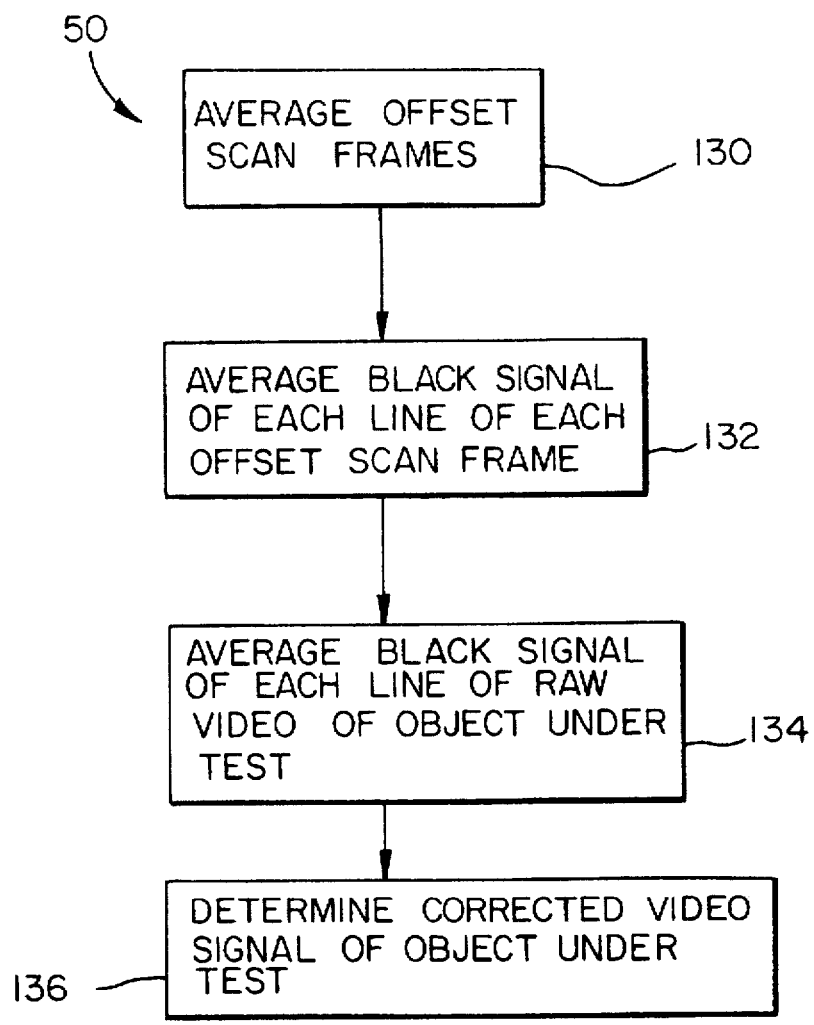
FIG. 15 is a flow chart illustrating a correction scheme for offsets.

In accordance with the third embodiment, two scans to collect image data are performed. In the first scan, which is referred to herein as an offset scan, data is collected with the x-ray source turned off. In the second scan, the object under test 28 is scanned with the x-ray source turned on. The digital data acquisition system (DDAS, and for the ease of reference, the DDAS consists of the image intensifier 12, the optical sensor (camera) 14, the A-to-D converter 18 and buffer 20) samples the back porch of each TV-line in each frame in the offset scan and stores this information. The DDAS also samples the video signal portion of each frame of the offset scan, i.e., of the black scene. FIG. 15 illustrates a flowchart 50 of a method for correcting an image frame for the effects of offset. At step 130, the computer averages the video signal of a predetermined number, M', of video frames of the offset scan according to equation (12):

$$\Omega(j,k) = \frac{1}{M'} \sum_{i=0}^{M'-1} \Omega(i,j,k) \quad (12)$$

where $\Omega$ (j,k) average signal of M' offset scans;

$\Omega$ (i,j,k) is the offset scan signal;

i labels the video-frame;

j labels the video-line;

k labels the column of a video-frame; and

M' is a number of offset video frames.

Next, at step 132, the computer 19, in order to find the true black scene signal of the offset scan, averages the back porch for each TV line of the black scene according to the equation (13):

$$\Omega°(j) = \frac{1}{b-a+1} \sum_{k=a}^{b} \Omega(j,k) \quad (13)$$

where $\Omega°$ (j) is the black signal average of the back porch portion of the offset scan video signal for each video line in each frame; and a and b define the width of the back porch. (FIGS. 12 and 14).

The computer then determines the average signal from the back porch of the scan of the object under test (step 134) according to equation (14):

$$R°(i,j) = \frac{1}{b-a+1} \sum_{k=a}^{b} R(i,j,k) \quad (14)$$

where $R°$ (i,j) is black signal average of the raw video signal;

$R(i,j,k)$ is the scan signal of the object under test;

a and b span the back porch of the video signal;

i labels the video-frame;

j labels the video-line; and k labels the column of a video-frame.

After the offset scan average $\Omega(j,k)$ and the black signal averages of the offset scan $\Omega°(j)$ and raw video $R°(i,j)$ averages are respectively determined in accordance with equations (12)–(14), the computer then calculates a corrected video signal R'(i,j,k) (step 136) according to equation (15):

$$R'(i,j,k) = \{R(i,j,k) - R°(i,j)\} - \{\Omega(j,k) - \Omega°(j)\}. \quad (15)$$

In equation (15), the expression in the second set of brackets is the approximation of the offsets of the video camera serving as optical sensor 14. The terms R° and $\Omega°$ correct the respective video signals for offset drift-in-time of the video camera. Thus, R'(i,j,k) is the video signal corrected for offset bias and for any time dependence of the black level. The black level is a relative level because the camera is AC-coupled with the rest of the data acquisition electronics. The subtraction within each bracketed term on the right hand side of equation (15) in effect forces the black level to an absolute value of zero.

In an alternative embodiment, the front porch or both the front and back porches of the video signal are averaged rather than just the back porch for the offset scan and/or the scan of the object under test.

Moreover, equation (13) can be calculated by the computer before equation (12), with obvious changes in notation.

In an alternate version of the third embodiment, the subtraction within the brackets of equation (15) can be performed by the electronics of the DDAS rather than by the computer.

Figure 16:
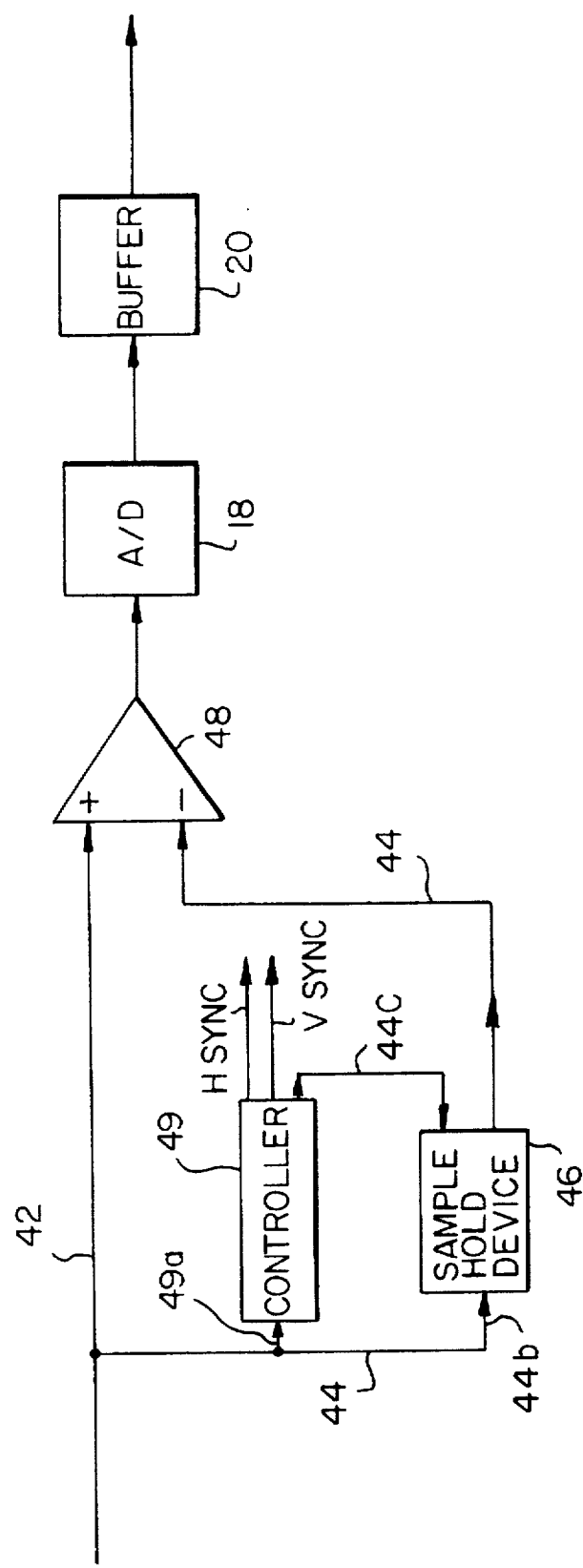
FIG. 16 is a block diagram of a system having a sample and hold device in accordance with an embodiment of the present invention.

FIG. 16 illustrates apparatus constructed for practicing this alternate version of the third embodiment. The video signal is bifurcated into two output lines 42 and 44, with output line 44 further split into lines 44a and 44b.

The sample and hold device 46, such as Burr Brown SHC5320KH, is controlled by a controller, such as National LM1881M, and samples the signal during the back porch region of the video signal only. The sample and hold device 46 averages the back porch signal and holds the average value. The output of the sample and hold device is connected to the negative side of a digital amplifier 48.

If the video signal is a composite video signal then the signal is passed via line 44a through a sync stripper 49. The output of the sync stripper 49, the burst, corresponds to the black level of the back porch and becomes the input for the sample and hold device 46. If the signal is not a composite video signal, then the sync stripper 49 is bypassed and the burst signal is replaced by a delayed horizontal synchronization signal which is equivalent to the black level of the back porch and is sent, via line 44c, to the sample and hold device 46.

The other video line 42 is directly connected to the positive input of the digital amplifier 48. As the video signal is fed into the positive input of the digital amplifier, the average value of the back porch is fed into the negative input of the digital amplifier. The digital amplifier 48, such as Burr Brown OPAG76JG wideband Op Amp, subtracts the average value of the back porch, as determined by the sample and hold device, from the video region of the video signal (FIG. 12) for both the offset scan and the scan of the object under test. After the signals are digitized by the analog-to-digital converter 18, both sets of data are stored in either memory 25 or in storage 23 after subtraction by the digital amplifier. The subtracted data for the offset scan are subtracted from the scan of the object under test by the computer at a later time giving the corrected video signal R'(i,j,k).

As an alternative embodiment, the correction for the effect of offsets precedes the corrections for the above-described spatial distortions, both magnetic and geometric.

This invention has application in image intensified computed tomography as well as digital radiography (DR) and digital subtraction angiography (DSA). If a volume CT image, DR image or and DSA image is desired, then all lines digitized are corrected. If, however, only central slice (two-dimensional CT) or multi-slice CT is desired, then only those lines needed for image reconstruction are corrected.

We claim:

1. A system for correcting spatial distortions in an imaging system for imaging an object under test, the imaging system including a distortion measuring object and having a plurality of reference point attenuators at predetermined spaced locations in said distortion measuring object, a background measuring object, said correcting system comprising:

means for generating a first image frame of said distortion measuring object with said plurality of reference point attenuators at said locations, said first image frame having representations of said reference point attenuators, said first image frame including spatial distortion;

means for generating a second image frame of said background measuring object;

means for subtracting the two generated image frames to produce a subtracted image frame including spatial distortion; and means for removing said spatial distortion, including:

means for automatically detecting approximate two-dimensional coordinates of said reference point attenuator representations in said subtracted image frame;

means for obtaining a plurality of smooth curves in two approximately orthogonal directions having curvatures fitted to the reference point attenuator representations;

means for determining refined two-dimensional coordinates in said subtracted image frame by locating intersections of said plurality of smooth curves;

means for generating a correction table including a two-dimensional correction coordinate corresponding to each refined two-dimensional coordinate in said subtracted image frame; and means for correcting said distortion of an image of the object under test in accordance with said correction coordinates in the correction table, and for providing a corrected image of the object under test.

2. An system according to claim 1, wherein said plurality of smooth curves is a first plurality of smooth curves, each said smooth curve parameterized by coefficients;

wherein said removing distortion means further includes:

means for fitting a second plurality of coefficient curves to the respective coefficients of said first plurality of smooth curves; and means for determining the two-dimensional coordinates between the refined reference point attenuator representations from said second plurality of coefficient curves.

3. An system according to claim 1, wherein said plurality of reference point attenuators comprises a pattern of radiopaque objects.

4. An system according to claim 3, wherein said radiopaque objects of said distortion measuring object comprise metallic spheres.

5. The system according to claim 1, wherein said means for generating image frames of said distortion measuring object and said background measuring object includes:

means for irradiating said objects with x rays from the imaging system;

means for detecting said x rays passing through said objects; and means for generating image data values, corresponding to said detected x rays of each of said image frames.

6. An system according to claim 1, wherein the spatial distortions are corrected by determining the correct data value for each two-dimensional refined coordinate in accordance with the corresponding two-dimensional correction coordinate.

7. An system according to claim 6, wherein each data value for the corrected image is determined according to the relationship:

$$\text{OUTPUT}(X,Y) = (1 - fy)^* \{fx^* (\text{INPUT}(ix + 1, iy) - \text{INPUT}(ix, iy)) + \text{INPUT}(ix, iy)\} + fy^* \{fx^* (\text{INPUT}(ix + 1, iy + 1) - \text{INPUT}(ix, iy + 1)) + \text{INPUT}(ix, iy + 1)\}$$

Where:

OUTPUT(X,Y)=Intensity value at column X, row Y for corrected image;

INPUT(ix,iy)=Intensity value at column ix, row iy for original distorted image;

X=Table-value(X,Y,1) (floating point);

Y=Table-value(X,Y,2) (floating point);

ix=integer part of x;

fx=fractional part of x;

iy=integer part of y; and fy=fractional part of y.

8. A system for correcting spatial distortions in an imaging system for imaging an object under test, said correcting system comprising:

a distortion measuring object having a plurality of reference point attenuators at predetermined spaced locations in said distortion measuring object;

means for generating an image frame of said distortion measuring object with said plurality of reference point attenuators in said locations, said image frame having representations of said reference point attenuators, said image frame including spatial distortions;

a background measuring object;

means for generating an image frame of said background measuring object;

means for subtracting the two generated image frames to produce a subtracted image frame including spatial distortion; and means for removing said spatial distortion, including:

means for automatically detecting approximate two-dimensional coordinates of said reference point attenuator representations in said subtracted image frame;

means for fitting a plurality of smooth curves in two approximately orthogonal directions having curvatures corresponding to the reference point attenuator representations;

means for determining refined two-dimensional coordinates in said subtracted image frame by locating intersections of said plurality of smooth curves;

means for generating a correction table including a two-dimensional correction coordinate corresponding to each refined two-dimensional coordinate in said subtracted image frame; and means for correcting said distortion of an image of the object under test in accordance with said correction coordinates in the correction table, and for providing a corrected image of the object under test.

9. A system for correcting spatial distortions in an imaging system for imaging an object under test, the imaging system including a distortion measuring object having a plurality of reference point attenuators at predetermined spaced locations in said distortion measuring object, a background measuring object, means for generating x rays and for detecting the generated x rays, means for generating a first image frame of said distortion measuring object with said plurality of reference point attenuators at said locations having representations of said reference point attenuators and including spatial distortion, means for generating a second image frame of said background measuring object, and means for storing said image frames, said correcting system comprising:

means for retrieving said image frames;

means for subtracting said image frames to produce a subtracted image frame including spatial distortion;

means for automatically determining approximate two-dimensional coordinates of said reference point attenuator representations in said subtracted image frame;

means for fitting a plurality of smooth curves to said two-dimensional coordinates of the reference point attenuator representations, each said smooth curve being parameterized by coefficients;

means for determining refined two-dimensional coordinates in said subtracted image frame by locating intersections of said smooth curves;

means for fitting a plurality of smooth curves to respective coefficients of the curves fit to said two-dimensional coordinates of said points;

means for determining dense points between the two-dimensional coordinates of the reference point attenuator representations;

means for generating a correction table including a two-dimensional correction coordinate corresponding to each refined two-dimensional coordinate in the image frame; and means for correcting the distortion in an image frame of an object under test in accordance with said correction coordinates in the correction table, and providing for a corrected image of the object under test.

10. A method for correcting spatial distortions in an imaging system for imaging an object under test, the imaging system including a distortion measuring object having a plurality of reference point attenuators at predetermined spaced locations in said distortion measuring object, a background measuring object, means for generating x rays and for detecting the generated x rays, means for generating a first image frame of said distortion measuring object with said plurality of reference point attenuators at said locations having representations of said reference point attenuators and including spatial distortion, means for generating a second image frame of said background measuring object, and means for storing the image frames, said correcting method including the steps of:

retrieving the image frames;

subtracting said image frames to produce a subtracted image frame including spatial distortion;

automatically determining approximate two-dimensional coordinates of said reference point attenuator representations in said image frame;

fitting a plurality of smooth curves to said two-dimensional coordinates of the reference point attenuator representations, each said smooth curve being parameterized by coefficients;

determining refined two-dimensional coordinates in said subtracted image frame by locating intersections of said smooth curves;

fitting a plurality of smooth curves to respective coefficients of the curves fit to said two-dimensional coordinates of said points;

determining dense points between the two-dimensional coordinates of the reference point attenuator representations;

generating a correction table including a two-dimensional correction coordinate corresponding to each refined two-dimensional coordinate in the image frame; and correcting the distortion in an image frame of an object under test in accordance with said correction coordinates in the correction table, and providing for a corrected image of the object under test.

11. A method for correcting spatial distortions in an imaging system for imaging an object under test, the imaging system including a distortion measuring object having a plurality of reference point attenuators at predetermined spaced locations in said distortion measuring object and a background measuring object, said correcting method including the steps of:

generating a first image frame of said distortion measuring object with said plurality of reference point attenuators at said locations, said first image frame having representations of said reference point attenuators, said first image frame including spatial distortion;

generating a second image frame of said background measuring object;

subtracting the two generated image frames to produce a subtracted image frame including spatial distortion; and removing said spatial distortion, including:

automatically detecting approximate two-dimensional coordinates of said reference point attenuator representations in said subtracted image frame;

fitting a plurality of smooth curves in two approximately orthogonal directions having curvatures corresponding to the reference point attenuator representations;

determining refined two-dimensional coordinates in said subtracted image frame by locating intersections of said plurality of smooth curves;

generating a correction table including a two-dimensional correction coordinate corresponding to each refined two-dimensional coordinate in said subtracted image frame; and correcting said distortion of an image of the object under test in accordance with said correction coordinates in the correction table, and providing a corrected image of the object under test.

12. The method according to claim 11, wherein said step of generating image frames of said distortion measuring object and background measuring object includes:

irradiating said objects with x rays from the imaging system;

detecting said x rays passing through said objects; and generating of image data values, corresponding to said detected x rays of each of said image frames.

13. The method according to claim 11, wherein the spatial distortions are corrected by determining the correct data value for each two-dimensional refined coordinate in accordance with the corresponding two-dimensional correction coordinate.

14. The method according to claim 13, wherein each data value for the corrected image is determined according to the relationship:

$$OUTPUT(X,Y) = (1-fy)^* \{fx^* (INPUT(ix+1,iy) - INPUT(ix,iy)) + INPUT(ix,iy)\} + fy^* \{fx^* (INPUT(ix+1,iy+1) - INPUT(ix,iy+1)) + INPUT(ix,iy+1)\}$$

Where:
OUTPUT(X,Y)=Intensity value at column X, row Y for corrected image
INPUT(ix,iy)=Intensity value at column ix, row iy for original distorted image;
X=Table-value(X,Y,1) (floating point);
Y=Table-value(X,Y,2) (floating point);
ix=integer part of x;
fx=fractional part of x;
iy=integer part of y; and
fy=fractional part of y.

15. An extraneous signals reduction system for reducing the effects of extraneous signals, including offsets, veiling glare, and/or scatter, in an imaging system, the imaging system including means for generating a beam of x rays having a predetermined beam shape and means for detecting x rays of the x-ray beam, the beam having a cross section projected on the detecting means to define a directly irradiated area of the detecting means and at least one non-irradiated area of the detecting means adjacent to the directly irradiated area, and means for generating an image frame representative of the detected x rays of the x-ray beam, the image frame having columns and rows of data values corresponding to at least one of detected x rays and extraneous signals, said extraneous signals reduction system comprises:

means for defining a first area of the image frame corresponding to the directly irradiated area of the detecting means;

means for defining at least one second area of the image frame corresponding to the at least one non-irradiated area of the detecting means; and means for correcting the data values in the first area of the image frame in accordance with the data values from the at least one second area of the image frame.

16. The system according to claim 15, comprising:

means for locating each row in a region of interest of the image frame containing at least one data value above a predetermined threshold value and corresponding to the first area of the image frame and for locating each row in a region of interest of the image frame containing all data values below said threshold value and corresponding to the at least one second area of the image frame;

means for summing the data values in each column for the rows containing at least one data value above said threshold value to provide an image sum and for summing the data values in each column for the rows containing all data values below said threshold value to provide a extraneous signals sum; and said means for correcting includes means for adjusting the data values in locations above the threshold value in the region of interest as a function of the image sum and the extraneous signals sum.

17. The system according to claim 15, wherein the rows with data values above a predetermined threshold value are located in a single contiguous image area in a region of interest of the image frame and corresponding to the first area of the image frame and the rows with values below said threshold value are located in a first contiguous extraneous signal area and a second contiguous extraneous signal area in a region of interest of the image frame directly adjacent to the image area and respectively on opposite sides thereof and corresponding to the at least one second area of the image frame;

wherein the means for defining a first area of the image frame includes means for determining the first area as the image area of the image frame; and wherein the means for defining at least one second area includes:
means for determining the second area as the first extraneous signal area of the image frame; and
means for determining a third area as the second extraneous signal area of the image frame.

18. The system according to claim 17, wherein the means for removing the effects of extraneous signals from the image frame is preceded by means for removing distortion of the image wherein said means for removing distortion comprises:

means for generating a first image frame of a distortion measuring object having a plurality of reference point attenuators at predetermined space locations, said first image frame having representations of said reference point attenuators, said first image frame including spatial distortions;

means for generating a second image frame of a background measuring object;

means for subtracting the two generated image frames to produce a subtracted image frame including spatial distortion; and means for removing said spatial distortion, including:
means for automatically detecting approximate two-dimensional coordinates of said reference point attenuator representations in said subtracted image frame;
means for fitting a plurality of smooth curves in two approximately orthogonal directions having curvatures corresponding to the reference point attenuator representations;
means for determining refined two-dimensional coordinates in said image frame by locating intersections of said plurality of smooth curves;
means for generating a correction table including a two-dimensional correction coordinate corresponding to each refined two-dimensional coordinate in the image frame; and
means for correcting said distortion of an image of the object under test in accordance with said correction coordinates in the correction table, and for providing a corrected image frame of the object under test.

19. The system according to claim 17, comprising:

means for locating each row in a region of interest of the image frame containing at least one data value above a predetermined threshold value and corresponding to the first area of the image frame and for locating each row in a region of interest of the image frame containing all data values below the certain threshold value and corresponding to the at least one second area of the image frame;

means for summing the data values in the first area of the image frame to provide an image sum and for summing the data values in each of the second and third areas to provide two extraneous signal sums; and said means for correcting includes means for adjusting the data values in locations above the threshold value in the region of interest as a function of the image sum and the extraneous signals sums, and wherein the extraneous signal sums are determined according to the following relationships:

$$S_1(i,k) = \sum_{j=j_1}^{j_2-1} R(i,j,k)$$

and $$S_3(i,k) = \sum_{j=j_3}^{j_4} R(i,j,k)$$

where $S_1$ (i,k) is extraneous signal sum of the second area;
$S_3$ (i,k) is extraneous signal sum of the third area;
R (i,j,k) labels the data values of each generated image frame;
i labels the image frame;
j labels each row of data values;
k labels each column of data values;
$j_1$ is the row at one edge of the second area;
$j_2$ is the row dividing the first and second areas;
$j_3$ is the row dividing the first and the third area; and
$j_4$ is the row at the other edge of the third area.

20. The system according to claim 19, wherein the image sum is determined according to the following relationship:

$$S_2(i,k) = \sum_{j=j_2}^{j_3-1} R(i,j,k)$$

where $S_2$ (i,k) is image sum;
R (i,j,k) labels the data values of each generated image frame;
i labels the image frame;
j labels each row of data values;
k labels each column of data values;
$j_2$ is the row at one edge of the first area; and
$j_3$ is the row at the other edge of the first area.

21. The system according to claim 20, wherein the imaging system includes means for generating a video signal which has a front porch region, a video region, and a back porch region; and wherein the noise reduction system determines the adjusted data values in the first area according to the following relationship:

$$R'(i,k) = S_2(i,k) - S_2°(i) - \frac{j_3 - j_2}{j_2 - j_1 + j_4 - j_3 + 1} \{S_1(i,k) - S_1°(i) + S_3(i,k) - S_3°(i)\}$$

where

R'(i,k) labels the corrected data values in the first area of image frame;

i labels the image frame;
j labels the image line;
k labels the image column;
$S_f$ (i,k) is sum of data values in the first area;
$S_1$ (i,k) is sum of data values in the second area;
$S_2$ (i, k) is sum of data values in the third area;
$S_1°$ (i) is the average of the front porch region of the video signal for each row of the second area;
$S_2°$ (i) is the average of the front porch region of the video signal for each row in the third area;
$j_1$ is the row at one edge of the second area;
$j_2$ is the row dividing the first and second areas;
$j_3$ is the row dividing the first and the third area; and
$j_4$ is the row at the other edge of the third area.

22. The system according to claim 17, wherein sequential column numbers and sequential row numbers are respectively assigned to the columns and rows of data values, wherein said means for defining a first area further includes:

means for identifying a plurality of rows in each column of said image frame with a data value above said threshold value;

means for identifying in each column the largest and the smallest row number from said plurality of rows in each column and for defining said first area as a function of the largest and smallest row number.

23. The system according to claim 22, wherein:

said means for determining said second area includes means for defining said second area as a function of the smallest row number in each column decremented by a first predetermined number of rows; and said means for determining said third area includes means for defining said third area as a function of the largest row number in each column incremented by a second predetermined number of rows.

24. The system according to claim 15, wherein the imaging system is for imaging an object under test, the imaging system further including a distortion measuring object having a plurality of reference point attenuators at predetermined spaced locations in said distortion measuring object and a background measuring object, said extraneous signals reduction system further including:

means for generating a first image frame of said background measuring object with said plurality of reference point attenuators in said locations, said first image frame having representations of said reference point attenuators, said first image frame including spatial distortions;

means for generating a second image frame of said background measuring object;

means for subtracting the two generated image frames to produce a subtracted image frame including spatial distortion;

means for removing said spatial distortion, including:

means for automatically detecting approximate two-dimensional coordinates of said reference point attenuator representations in said subtracted image frame;

means for fitting a plurality of smooth curves in two approximately orthogonal directions having curvatures corresponding to the reference point attenuator representations;

means for determining refined two-dimensional coordinates in said image frame by locating intersections of said plurality of smooth curves;

means for generating a correction table including a two-dimensional correction coordinate corresponding to each refined two-dimensional coordinate in the image frame; and means for correcting said distortion of an image of the object under test in accordance with said correction coordinates in the correction table, and for providing a corrected image frame of the object under test; and said means for correcting the data values including means for correcting the data values of the corrected image frame.

25. A method for reducing the effects of extraneous signals, including offsets, veiling glare, and/or scatter in an imaging system, the imaging system including means for generating a beam of x rays, the beam having a cross section projected on the detecting means to define a directly irradiated area of the detecting means and at least one non-irradiated area of the detecting means adjacent to the directly irradiated area, and means for generating an image frame representative of the detected x rays of the x-ray beam, the image frame having columns and rows of data values corresponding to at least one of detected x rays and extraneous signals, said reducing method including the steps of:

defining a first area of the image frame corresponding to the directly irradiated area of the detecting means;

defining at least one second area of the image frame corresponding to the at least one non-irradiated area of the detecting means; and correcting the data values in the first area of the image frame in accordance with the data values from the at least one second area of the image frame.

26. The method according to claim 25, including the steps of:

locating each row in a region of interest of the image frame containing at least one data value above a predetermined threshold value and locating each row in a region of interest of the image frame containing all data values below the certain threshold value;

summing the data values in each column for the rows containing at least one data value above the threshold value to provide an image sum and summing the data values in each column for the rows containing all data values below the threshold value to provide a extraneous signal sum; and said step of correcting includes adjusting the data values in locations above the threshold value in the region of interest as a function of the image sum and the extraneous signal sum.

27. The method according to claim 25, wherein the rows with data values above a predetermined threshold value are located in a single contiguous image area in a region of interest of the image frame and the rows with values below the threshold value are located in first and second contiguous extraneous signal areas in a region of interest of the image frame directly adjacent to the image area and respectively on opposite sides thereof;

wherein the step of defining a first area of the image frame includes means for determining the first area as the image area of the image frame;

wherein the step of defining at least one second area includes:

determining the second area as the first extraneous signal area of the image frame; and determining a third area as the second extraneous signal area of the image frame.

28. The method according to claim 27, wherein the steps of removing the effects of extraneous signals from the image frame is preceded by a method of removing distortion of the image wherein said method includes the steps of:

generating a first image frame of a distortion measuring object with a plurality of reference point attenuators at predetermined spaced locations, said first image frame having representations of said reference point attenuators, said first image frame including spatial distortions;

generating a second image frame of a background measuring object;

subtracting the two generated image frames to produce a subtracted image frame including spatial distortion; and removing said spatial distortion, including:

automatically detecting approximate two-dimensional coordinates of said reference point attenuator representations in said subtracted image frame;

fitting a plurality of smooth curves in two approximately orthogonal directions having curvatures corresponding to the reference point attenuator representations;

determining refined two-dimensional coordinates in said image frame by locating intersections of said plurality of smooth curves;

generating a correction table including a two-dimensional correction coordinate corresponding to each refined two-dimensional coordinate in the image frame; and correcting said distortion of an image of the object under test in accordance with said correction coordinates in the correction table, and providing a corrected image frame of the object under test.

29. The method according to claim 27, wherein sequential column numbers and sequential row numbers are respectively assigned to the columns and rows of data values, wherein said step of defining a first area further includes:

identifying a plurality of rows in each column of said image frame with a data value above the threshold value;

identifying the largest and the smallest row number from said plurality of rows in each column and defining the first area as a function of the largest and smallest row number.

30. The method according to claim 29, wherein:

said step of determining the second area includes defining the second area as a function of the smallest row number in each column decremented by a first predetermined number of rows; and said step of determining a third area includes defining the third area as a function of the largest row number in each column incremented by a second predetermined number of rows.

31. The method according to claim 25, wherein the imaging system is for imaging an object under test, the imaging system further including a distortion measuring object having a plurality of reference point attenuators at predetermined spaced locations in said distortion measuring object and a background measuring object, said method of reducing extraneous signals further includes the steps of:

generating a first image frame of said distortion measuring object with said plurality of reference point attenuators in said locations, said first image frame having representations of said reference point attenuators, said first image frame including spatial distortions;

generating a second image frame of said background measuring object without said plurality of removable reference point attenuators;

subtracting the two generated image frames to produce a subtracted image frame including spatial distortion; and removing said spatial distortion including:
    automatically detecting approximate two-dimensional coordinates of said reference point attenuator representations in said subtracted image frame;
    fitting a plurality of smooth curves in two approximately orthogonal directions having curvatures corresponding to the reference point attenuator representations;
    determining refined two-dimensional coordinates in said image frame by locating intersections of said plurality of smooth curves;
    generating a correction table including a two-dimensional correction coordinate corresponding to each refined two-dimensional coordinate in the image frame; and
    correcting said distortion of an image of the object under test in accordance with said correction coordinates in the correction table, and for providing a corrected image frame of the object under test; and correcting the data values including means for correcting the data values of the corrected image frame.

* * * * *